(12) United States Patent  
Kaga et al.

(10) Patent No.: US 10,578,888 B2  
(45) Date of Patent: *Mar. 3, 2020

(54) PAIR OF SPECTACLE LENSES FOR BINOCULAR VISION, MANUFACTURING METHOD, SUPPLY SYSTEM AND SUPPLY PROGRAM THEREOF

(71) Applicants: Tadashi Kaga, Tokyo (JP); Ayumu Ito, Tokyo (JP); Kazuma Kozu, Tokyo (JP)

(72) Inventors: Tadashi Kaga, Tokyo (JP); Ayumu Ito, Tokyo (JP); Kazuma Kozu, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 0 days.

This patent is subject to a terminal disclaimer.

(21) Appl. No.: 15/539,800

(22) PCT Filed: Dec. 28, 2015

(86) PCT No.: PCT/JP2015/086465  
§ 371 (c)(1),  
(2) Date: Jun. 26, 2017

(87) PCT Pub. No.: WO2016/104808  
PCT Pub. Date: Jun. 30, 2016

(65) Prior Publication Data  
US 2018/0004010 A1  Jan. 4, 2018

(30) Foreign Application Priority Data

Dec. 26, 2014  (JP) ................................ 2014-266555

(51) Int. Cl.  
*G02C 7/06* (2006.01)  
*G02C 7/02* (2006.01)  
(Continued)

(52) U.S. Cl.  
CPC .......... *G02C 7/066* (2013.01); *G02B 27/0101* (2013.01); *G02C 7/02* (2013.01);  
(Continued)

(58) Field of Classification Search  
CPC ........ G02C 7/024; G02C 7/061; G02C 7/066; G02C 7/086; G02C 7/088; G02C 7/063; G02B 23/12; G02B 27/0101  
See application file for complete search history.

(56) References Cited

U.S. PATENT DOCUMENTS 5,204,702 A * 4/1993 Shapiro .................... G02C 7/00  
 351/159.58  
6,129,435 A  10/2000 Reichow et al.  
(Continued)

FOREIGN PATENT DOCUMENTS

DE  3113077 A1  2/1983  
JP  H11-295670 A  10/1999  
(Continued)

OTHER PUBLICATIONS

Jun. 27, 2017 International Preliminary Report on Patentability issued in International Patent Application No. PCT/JP2015/086465.  
(Continued)

*Primary Examiner* — Jordan M Schwartz  
(74) *Attorney, Agent, or Firm* — Oliff PLC

(57) ABSTRACT

A technology concerning a pair of spectacle lenses for binocular vision. In each of the pair of spectacle lenses for binocular vision, when an inner horizontal direction of each of the spectacle lenses is a direction toward the nose of a user who wears the spectacle lenses, and an outer horizontal direction of the spectacle lenses is a direction toward an ear of the user, a portion for viewing an object at finite distance is provided in each of the pair of spectacle lenses for binocular vision and a shape of a base in prism is formed in  
(Continued)

the position such that a line of sight of a user viewing an object through the portion is directed to a direction that is different from a direction from the object.

22 Claims, 38 Drawing Sheets

(51) Int. Cl.
*G02C 7/14* (2006.01)
*G02B 27/01* (2006.01)

(52) U.S. Cl.
CPC .............. *G02C 7/024* (2013.01); *G02C 7/06* (2013.01); *G02C 7/061* (2013.01); *G02C 7/063* (2013.01); *G02C 7/065* (2013.01); *G02C 7/14* (2013.01); *G02B 2027/0136* (2013.01)

(56) References Cited

U.S. PATENT DOCUMENTS

| | | | |
|---|---|---|---|
| 2006/0139571 A1 | 6/2006 | Poulain et al. | |
| 2006/0170863 A1 | 8/2006 | Krall | |
| 2008/0137033 A1* | 6/2008 | Padula | G02C 7/14 351/159.58 |
| 2009/0222122 A1 | 9/2009 | Daimaru et al. | |
| 2010/0245762 A1* | 9/2010 | Krall | G02C 7/061 351/159.42 |
| 2012/0062838 A1* | 3/2012 | Gottlieb | G02C 7/14 351/159.77 |
| 2015/0036102 A1* | 2/2015 | Ghosh | G02C 7/14 351/205 |
| 2015/0049301 A1* | 2/2015 | Krall | G02C 7/065 351/159.42 |

FOREIGN PATENT DOCUMENTS

| | | |
|---|---|---|
| JP | 2002-511594 A | 4/2002 |
| JP | 2007-327984 A | 12/2007 |
| JP | 2008-529100 A | 7/2008 |
| WO | 2007/077848 A1 | 7/2007 |
| WO | 2010/111113 A1 | 9/2010 |
| WO | 2013/123558 A1 | 8/2013 |

OTHER PUBLICATIONS

Mar. 8, 2016 Search Report issued in International Patent Application No. PCT/JP2015/086465.

Hirouchi, "A stereo-photographic viewer with which zooming can be made by using a fusion equation," Bukyo University Faculty of Information and Communication: Information Research, No. 46, Jan. 2012.

Aug. 1, 2018 Search Report issued in European Patent Application No. 15873376.6.

Seki, "Basic binocular vision," Koryu Shuppansha Co. Ltd, Apr. 2009.

* cited by examiner

COMPARATIVE EXAMPLE 3 (REFERENCE EXAMPLE)

(a) SURFACE POWER IN HORIZONTAL DIRECTION (b) SURFACE POWER IN VERTICAL DIRECTION

EXAMPLE 7

(a) SURFACE POWER IN HORIZONTAL DIRECTION
(b) SURFACE POWER IN VERTICAL DIRECTION

HORIZONTAL LINE, WHICH IS PARALLEL WITH THE LINE PASSING THROUGH TWO ENGRAVING MARKS AND WHICH PASSES THROUGH THE MID-POINT OF THE LINE SEGMENT CONNECTING THE DISTANCE POWER MEASUREMENT POINT AND THE NEAR POWER MEASUREMENT POINT

PAIR OF SPECTACLE LENSES FOR BINOCULAR VISION, MANUFACTURING METHOD, SUPPLY SYSTEM AND SUPPLY PROGRAM THEREOF

TECHNICAL FIELD

The present invention relates to a pair of spectacle lenses for binocular vision, a manufacturing method, a supply system, and a supply program thereof.

BACKGROUND ART

Nowadays, various spectacle lenses for vision correction are known. For example, several examples can be put forward, such as a single vision lens in which one region for seeing an area at a predetermined distance is provided, a single vision lens in which power changes as view departs from the region, and a progressive power lens (a progressive multifocal lens in this description) which includes a portion (so-called progressive portion) where power changes continuously with respect to above two lenses.

For example, a progressive power lens according to PTL 1 includes: a distance portion which has distance power for distance vision; a near portion which has near power for near vision; and a progressive portion which exists between the distance portion and the near portion. In the spectacle lenses according to PTL 1, the distance portion and the near portion each have a respective prism, of which power is different from each other. A prism is provided as a prescription to correct visual symptoms of a user, such as strabismus, heterophoria and fixation disparity. Hereafter this prism is called a "prescription prism". In paragraph [0004] of PTL 1, it is mentioned that double vision and poor depth perception may be experienced if the prisms of both eyes are incorrectly prescribed. An object of PTL 1 is to provide correctly prescribed prisms to progressive multifocal lenses, so that binocular vision can be comfortably exhibited in both the distance vision and near vision (paragraph [0005] in PTL 1).

CITATION LIST

Patent Literature

[PTL 1] Japanese Patent Application Laid-open No. H11-295670

SUMMARY OF INVENTION

Technical Problem

Research on spectacle lenses for a user to see an object clearly is currently ongoing. In particular, a progressive power lens, which has a distance portion and a near portion and thus is multifocal, for example, can provide very clear vision to a user of which the ocular accommodation ability is deteriorating due to aging.

However, despite the high performance of progressive power lenses, the popularity of the progressive power lenses is equivalent to or less than that of various single vision lenses mentioned above.

To seek the reason for this situation, the present inventors investigated users of spectacle lenses of different generations. As a result, it became clear that the following hidden needs exist. In other words, the needs for clear vision certainly exist across all generations, but the needs to see an object in a magnified state when wearing spectacle lenses increase as the ages of users increase. It becomes clear that these needs in particular increase when an object at a finite distance is viewed.

Further, it is obvious that the needs to see an object in a magnified state exist not only for progressive power lenses but also for single vision and other lenses as well.

A method to meet these needs is to provide a magnifier (loupe) that is attachable to the spectacle frame, such that this magnifier can be inserted between the spectacle lens and an object as an attachment. In the case of this method, however, the configuration of the spectacle frame must be changed to allow a detachable attachment. Then choices of spectacle frames for the user decrease dramatically. Furthermore, additional processing is required for the spectacle frame, which increases cost. And the magnifier is also required along with the manufacture of spectacle lenses, which increases cost on the user side.

It is an object of the present invention to provide a technology to visually perceive a magnified object by wearing spectacle lenses.

Solution to Problem

To solve the above mentioned problem, the present inventors performs diligent researches. First the present inventors considered to integrate the magnifying function to the spectacle lens itself, instead of as an attachment. After diligent researches based on this concept, the present inventors conceived of a method to solve the above mentioned problem using not one spectacle lens, but a pair of spectacle lenses for binocular vision.

In concrete terms, a base in prism is disposed in each of the pair of spectacle lenses for binocular vision, independent from the prescription prism. Thereby parallax is intentionally generated between both eyes when the line of sight passes through each spectacle lens. Then the following method is also conceived: fusing each object image which entered through each eye (or "fusion"), which is a process performed in the brain of the user in the case of binocular vision, an image of an object is magnified, thereby the magnified image is perceived by the user.

This method of intentionally generating parallax is a technical concept that is completely the opposite of "allowing the user to see an object clearly", which is a selling point of conventional spectacle lenses (particularly progressive power lenses) as mentioned above. "Magnifying an object and allowing the user to visually perceive the magnified object" is a concept conforming to the laws of nature and a technical idea, which will be described later.

Based on this information, the present invention has following aspects.

In a first aspect of the invention, a pair of spectacle lenses for binocular vision is provided, and in each of the pair of spectacle lenses for binocular vision, when an inner horizontal direction of each of the spectacle lenses is a direction toward the nose of a user who wears the spectacle lenses and an outer horizontal direction of each of the spectacle lenses is a direction toward an ear of the user, a portion for viewing an object at a finite distance is disposed in each of the pair of spectacle lenses for binocular vision, and a shape of a base in prism is formed in the portion such that a line of sight of the user viewing the object through the portion is directed to a direction that is different from a direction from the object.

In a second aspect of the invention according to the first aspect, the portion for viewing an object at a finite distance is a near portion.

In a third aspect of the invention according to the first or second aspect, each of the spectacle lenses includes a portion in which power changes continuously.

In a fourth aspect of the invention according to the third aspect, when the upper direction of each of the spectacle lenses is a direction of top of the spectacle lens and the lower direction of each of the spectacle lenses is a direction of bottom of the spectacle lens while the user wears the spectacle lens, the base in prism is disposed in a part that is lower than a specific distance power measurement point, a prism power measurement point, or a fitting point in the spectacle lens.

In a fifth aspect of the invention according to the third or fourth aspect, when the upper direction of each of the spectacle lenses is a direction of top of the spectacle lens and the lower direction of each of the spectacle lenses is a direction of bottom of the spectacle lens while the user wears the spectacle lens, each of the spectacle lenses includes a portion for viewing an object at a specific distance, a near portion for viewing an object at a distance nearer than the specific distance, and a progressive portion which is between the portion and the near portion and in which the power changes,
the spectacle lenses satisfying the following equation:

$$P_N - P_F < \text{ADD}*h/10$$

where $P_F$ denotes an amount of prism (Δ) at a power measurement point of the portion for viewing an object at a specific distance, and $P_N$ denotes an amount of prism (Δ) at a near power measurement point. The amount of prism indicates a positive value in a case of a base out prism and a negative value in a case of a base in prism.

Further, ADD denotes an addition power (D), and h denotes an amount of inset (mm) in the spectacle lens, in which a positive direction is toward the nose and a negative direction is toward the ear when viewed from a vertical line connecting an upper vertex and a lower vertex of the spectacle lens.

In a sixth aspect of the invention according to the fifth aspect, each of the spectacle lenses satisfies the following equation:

$$|P_N - P_F - \text{ADD}*h/10| \geq 0.25.$$

In a seventh aspect of the invention according to any one of the third to sixth aspects, when the upper direction of each of the spectacle lenses is a direction of top of the spectacle lens and the lower direction of each of the spectacle lenses is a direction of bottom of the spectacle lens while the user wears the spectacle lens, at least a part of the portion of the spectacle lens includes a shape of continuously twisting at least one shape of an object side surface and an eyeball side surface of the spectacle lens in a horizontal cross-sectional view of the portion, in a lower direction of the spectacle lens, so that the amount of the base in prism increases in the lower direction.

In a eighth aspect of the invention according to the seventh aspect, an absolute value of a difference between surface power values in the vertical direction in positions ±15 mm from a point, through which a main line of sight passes, is 0.25 D or more, on a line which is parallel with a line passing through two engraving marks of the spectacle lens and which passes through any point on a line segment connecting a specific distance power measurement point and a near power measurement point.

In a ninth aspect of the invention according to the eighth aspect, any point on the line segment connecting the specific distance power measurement point and the near power measurement point is located in a ±3 mm range in a perpendicular direction from a mid-point as reference between the specific distance power measurement point and the near power measurement point.

In a tenth aspect of the invention according to the seventh aspect, an absolute value of a difference between surface power values in the horizontal direction in positions ±5 mm from a point, through which a main line of sight passes, is 0.12 D or more, on a line which is parallel with a line passing through two engraving marks of the spectacle lens and which passes through any point on a line segment connecting a specific distance power measurement point and a near power measurement point.

In a eleventh aspect of the invention according to the tenth aspect, any point on the line segment connecting the specific distance power measurement point and the near power measurement point is located in a ±3 mm range in a perpendicular direction from a mid-point as reference between the specific distance power measurement point and the near power measurement point.

In a twelfth aspect of the invention according to any one of the third to seventh aspects, the shape of the base in prism is also formed in parts in the outer horizontal direction and in the inner horizontal direction when viewed from the portion of the spectacle lens.

In a thirteenth aspect of the invention according to the twelfth aspect, when the upper direction of each of the spectacle lenses is a direction of top of the spectacle lens and the lower direction of each of the spectacle lenses is a direction of bottom of the spectacle lens while the user wears the spectacle lens, an absolute value of a difference between surface power values in the vertical direction in positions ±15 mm from a point, through which a main line of sight passes, is 0.25 D or more, on a line which is parallel with a line passing through two engraving marks of the spectacle lens and which passes through a point that is 3 mm higher in the vertical direction from a mid-point of a line segment connecting a specific distance power measurement point and a near power measurement point.

In a fourteenth aspect of the invention according to the twelfth aspect, an absolute value of a difference between surface power values in the vertical direction in positions ±15 mm from a point, through which a main line of sight passes, is 0.25 D or more, on a line which is parallel with a line passing through two engraving marks of the spectacle lens and which passes through a mid-point of a line segment connecting a specific distance power measurement point and a near power measurement point.

In a fifteenth aspect of the invention according to the twelfth aspect, when the upper direction of each of the spectacle lenses is a direction of top of the spectacle lens and the lower direction of each of the spectacle lenses is a direction of bottom of the spectacle lens while the user wears the spectacle lens, an absolute value of a difference between surface power values in the vertical direction in positions ±15 mm from a point, through which a main line of sight passes, is 0.25 D or more, on a line which is parallel with a line passing through two engraving marks of the spectacle lens and which passes through a point that is 3 mm lower in the vertical direction from a mid-point of a line segment connecting a specific distance power measurement point and a near power measurement point.

In a sixteenth aspect of the invention according to any one of the third to seventh aspect, the amount of the base in prism is decreased in the outer horizontal direction and inner horizontal direction from the portion of the spectacle lens.

In a seventeenth aspect of the invention according to the sixteenth aspect, when the upper direction of each of the spectacle lenses is a direction of top of the spectacle lens and the lower direction of each of the spectacle lenses is a direction of bottom of the spectacle lens while the user wears the spectacle lens, an absolute value of a difference between surface power values in the horizontal direction in positions ±5 mm from a point, through which a main line of sight passes, is 0.12 D or more, on a line which is parallel with a line passing through two engraving marks of the spectacle lens and which passes through a point that is 3 mm lower in the vertical direction from a mid-point of a line segment connecting a specific distance power measurement point and a near power measurement point.

In a eighteenth aspect of the invention according to the sixteenth aspect, an absolute value of a difference between surface power values in the horizontal direction in positions ±5 mm from a point, through which a main line of sight passes, is 0.12 D or more, on a line which is parallel with a line passes through two engraving marks of the spectacle lens and which passes through a mid-point of a line segment connecting a specific distance power measurement point and a near power measurement point.

In a nineteenth aspect of the invention according to the sixteenth aspect, when the upper direction of each of the spectacle lenses is a direction of top of the spectacle lens and the lower direction of each of the spectacle lenses is a direction of bottom of the spectacle lens while the user wears the spectacle lens, an absolute value of a difference between surface power values in the horizontal direction in positions ±5 mm from a point, through which a main line of sight passes, is 0.12 D or more, on a line which is parallel with a line passing through two engraving marks of the spectacle lens and which passes through a point that is 3 mm higher in the vertical direction from a mid-point of a line segment connecting a specific distance power measurement point and a near power measurement point.

In a twentieth aspect of the invention according to any one of the third to nineteenth aspects, an amount of the base in prism is 2Δ or less.

In a twenty first aspect of the invention, a manufacturing method for a pair of spectacle lenses for binocular vision is provided, the method including: when an inner horizontal direction of each of the spectacle lenses is a direction toward the nose of a user who wears the spectacle lenses, and an outer horizontal direction of each of the spectacle lenses is a direction toward an ear of the user, a designing step of providing a portion for viewing an object at a finite distance to each of the pair of spectacle lenses for binocular vision, and forming a shape of a base in prism in the portion such that a line of sight of the user viewing the object through the portion is directed to a direction that is different from a direction from the object; and a manufacturing step of manufacturing the pair of spectacle lenses for binocular vision based on a result of the designing step.

In a twenty second aspect of the invention, a supply system of a pair of spectacle lenses for binocular vision is provided, the system including: when an inner horizontal direction of each of the spectacle lenses is a direction toward the nose of a user who wears the spectacle lenses and an outer horizontal direction of each of the spectacle lenses is a direction toward an ear of the user, a receiving unit configured to receive information on the spectacle lenses; a designing unit configured to provide, based on the information on the spectacle lenses, a portion for viewing an object at a finite distance to each of the pair of spectacle lenses for binocular vision, and form a shape of a base in prism in the portion such that a line of sight of the user viewing the object is directed to a direction that is different from a direction from the object; and a transmitting unit configured to transmit design information that is acquired by the designing unit.

In a twenty third aspect of the invention, a supply program of a pair of spectacle lenses for binocular vision is provided, which causes a computer to perform functions for the following unit: when an inner horizontal direction of each of the spectacle lenses is a direction toward the nose of a user who wears the spectacle lenses and an outer horizontal direction of each of the spectacle lenses is a direction toward an ear of the user, the supply program of a pair of spectacle lenses for binocular vision functions as: a receiving unit configured to receive information on the spectacle lenses; a designing unit configured to provide, based on the information on the spectacle lenses, a portion for viewing an object at a finite distance to each of the pair of spectacle lenses for binocular vision, and form a shape of a base in prism in the portion such that a line of sight of the user viewing the object is directed to a direction that is different from a direction from the object; and a transmitting unit configured to transmit design information that is acquired by the designing unit.

Advantageous Effects of Invention

According to this invention, a technology to magnify an object and allow the user to visually perceive the magnified object by wearing spectacle lenses can be provided.

BRIEF DESCRIPTION OF DRAWINGS

FIG. 1(a) depicts a state when a visual target is seen with both eyes in response to a convergence request and fusion is performed by the brain, whereby the visual target is perceived as being smaller and nearer (so-called Small In: SI), and FIG. 1(b) depicts a state when a visual target is seen with both eyes responding to a divergence request and fusion is performed by the brain, whereby the visual target is perceived as being larger and more distant (so-called Large Out: LO).

FIG. 25(d) is an enlarged view of a part of FIG. 25(c).

FIG. 26(a) is a distribution map of a surface power in the horizontal direction, and FIG. 26(b) is a distribution map of a surface power in the vertical direction.

FIG. 27(a) is a distribution map of a surface power in the horizontal direction, and FIG. 27(b) is a distribution map of a surface power in the vertical direction.

FIG. 28(a) is a distribution map of a surface power in the horizontal direction, and FIG. 28(b) is a distribution map of a surface power in the vertical direction.

FIG. 29(a) is a distribution map of a surface power in the horizontal direction, and FIG. 29(b) is a distribution map of a surface power in the vertical direction.

FIG. 30(a) is a distribution map of a surface power in the horizontal direction, and FIG. 30(b) is a distribution map of a surface power in the vertical direction.

FIG. 31(a) is a distribution map of a surface power in the horizontal direction, and FIG. 31(b) is a distribution map of a surface power in the vertical direction.

FIG. 32(a) is a distribution map of a surface power in the horizontal direction, and FIG. 32(b) is a distribution map of a surface power in the vertical direction.

DESCRIPTION OF EMBODIMENTS

Figure 1:
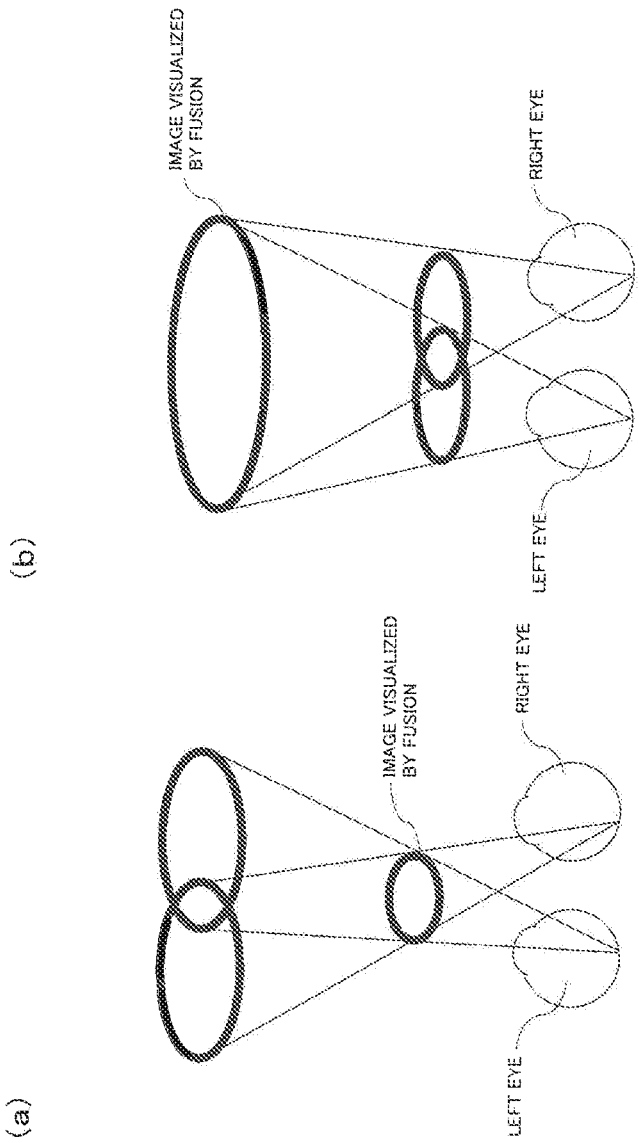
FIG. 1 are schematic plan views depicting the SILO phenomena, where

[Embodiment 1]
This embodiment is described in the following sequence.
1. Technical idea of this invention
　1-1. Technical background
　1-2. Estimation of magnification change
2. Pair of spectacle lenses for binocular vision
　2-1. Configuration of spectacle lens
　2-2. Difference from prior art
　2-3. Determination method In this description, it is assumed that the upper direction is a direction of top of the spectacle lens, and the lower direction is a direction of bottom of the spectacle lens. If a user moves their lines of sight from above to below through the spectacle lenses, the eyes converge inward.

Further, in this description, the inner horizontal direction is a direction toward the nose of the user, and the outer horizontal direction is a direction toward the ear of the user.

In this description, the horizontal direction is 0° or 180° in defining the astigmatic axis and the prism base direction, and an example when the horizontal direction matching the direction of the horizontal reference line connecting two alignment reference marks (so-called engraving marks) for fitting the lens into the frame is described. The horizontal reference line in this embodiment refers to the line that extends horizontally at a mid-point between the upper vertex and the lower vertex of the spectacle lens (lens before being fit into the frame).

<1. Technical Idea of this Invention>
(1-1. Technical Background)
The background of the technical idea of this invention is described.

A background of this invention involves researches on the biological visual characteristics of human eyes. These visual characteristics include the SILO phenomena (see for example "Basic binocular vision", Koryu Shuppansha Co. Ltd, Shinji Seki, Revised, Apr. 1, 2009).

SILO is an acronym for Small In Large Out.

In the SILO phenomenon, when an individual sees a visual target with both eyes in response to a convergence request (i.e., by converging both eyes), fusion is performed by the brain, and the visual target is perceived as being smaller and nearer (so-called Small In: SI), as illustrated in FIG. 1(a).

On the other hand, when the individual sees a visual target with both eyes in response to a divergence request (i.e., without converging the eyes), fusion is performed by the brain, and the visual target is perceived as being larger and more distant (so-called Large Out: LO), as illustrated in FIG. 1(b).

The SILO phenomenon can be explained in geometric-optical terms as follows.

For example, FIG. 1(a) is an example in which SI occurs. In a case where the right eye can see the left visual target and the left eye can see the right visual target (i.e., case where parallax is generated as excessive convergence is generated in the lines of sight of both eyes), fusion is generated in a position where the lines of sight cross (i.e., position closer to the eyeballs than the visual target). Then as illustrated in FIG. 1(a), the visual target is perceived as smaller and nearer.

FIG. 1(b), on the other hand, is an example in which LO occurs. In a case where the right eye can see the right visual target and the left eye can see the left visual target (i.e., case where parallax is generated in a divergence state which does not cause convergence in the lines of sight of both eyes), fusion is generated in a position where the lines of sight cross (i.e., position more distant from the visual target). Then as illustrated in FIG. 1(b), the visual target is perceived as larger and more distant.

Another document (Bunkyo University Faculty of Information and Communication: Information Research, No. 46, "Fusion type zoomable stereo-photo viewer", Tetsuo Hirouchi, January 2012) also discloses a technology of using parallax of both eyes on an image for the left eye and an image for the right eye, so that when the image is perceived by fusion, the user can perceive the image that looks more distant but still magnified.

As described above, the present inventors obtained knowledge that the SILO phenomenon is caused by fusion. Then the present inventors conceived of the possibility of applying this SILO phenomenon to spectral lenses, a first among those skilled in the art. Then the present inventors obtained new knowledge that the function of LO, as illustrated in FIG. 1(b), is implemented by providing a base in prism to each of a pair of spectacle lenses for binocular vision respectively.

Figure 2:
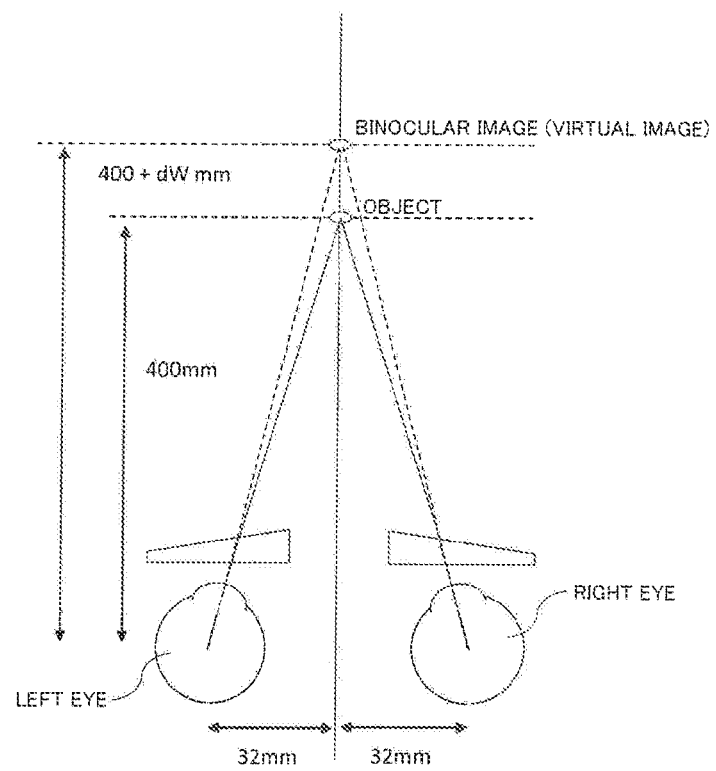
FIG. 2 is a schematic top view depicting a position of an object which a user perceives via the base in prisms (i.e., position of the virtual image) when the object is disposed at the central front of both eyeballs in a front view direction of the user.
Figure 3:
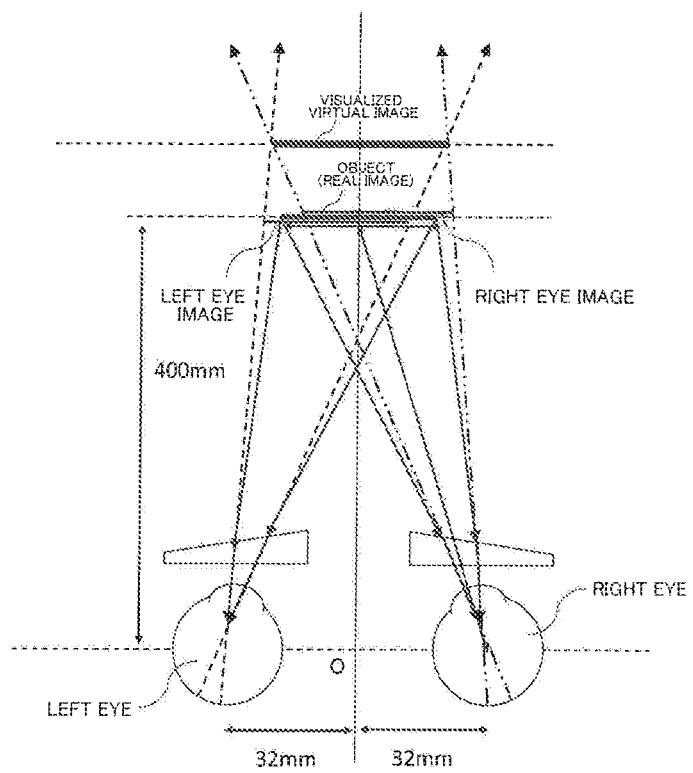
FIG. 3 is a diagram depicting the size of the object (i.e., size of the virtual image) based on FIG. 2.

The reason why providing the base in prism exhibits the LO function as illustrated in FIG. 1(b) is described in brief with reference to FIG. 2 and FIG. 3. FIG. 2 is a schematic top view depicting a position of an object which the user perceives via the base in prism (i.e., position of the virtual image) when the object is disposed at the central front of both eyeballs in a front view direction of the user. FIG. 3 is a diagram depicting the size of the object (i.e., size of the virtual image) based on FIG. 2. In FIG. 2 and FIG. 3, the distance to the object is set as 400 mm, the distance to the virtual image is set as 400+dW mm, and the pupil distance is set as 32 mm * 2=64 mm.

As illustrated in FIG. 2, the user sees the "object" in FIG. 2 with both eyes (solid lines). However, if the base in prism is provided to each spectacle lens, the user can see the object with both eyes, even if the eyeballs move in divergent (broken lines) directions, which is the opposite direction of convergence.

As a result, the line of sight direction of each eye becomes as illustrated in FIG. 3. As described above, fusion in the brain is performed at the position where the lines of sight of the eyes cross. Therefore the "virtual image" is perceived at a position more distant from the actual object, but is perceived as larger than the real image of the object.

The virtual image is perceived larger than the real image in the case where the viewing angles do not change before and after the base in prisms are provided. In other words, unless various conditions, including the viewing angles, are changed before and after the user wears the spectacle lenses, the magnified virtual image is perceived by the presence of the base in prisms, and the above mentioned effect of the present invention can be exhibited.

(1-2. Estimation of Magnification Change)

Magnification when the virtual image is magnified compared with the real image by the pair of spectacle lenses for binocular vision provided with the base in prism, is described. The magnification depends on the user, since convergence and the degree of cycloduction of each user, and fusion in the brain of the user, are related to the magnification. Here, however, the magnification is described with reference to FIG. 4 using one exemplary model case in order to describe this embodiment as detailed as possible.

Figure 4:
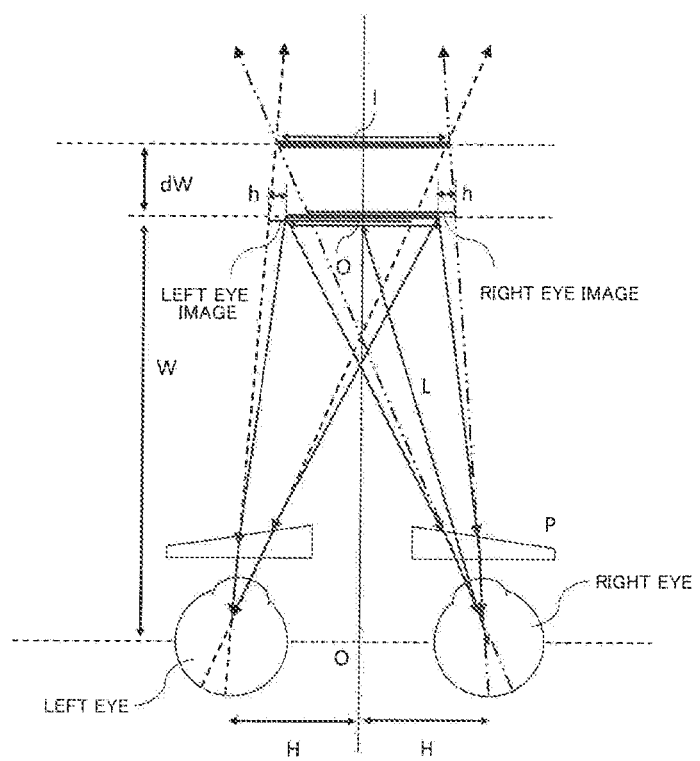
FIG. 4 is a diagram when a reference sign is added to each composing element in FIG. 3, in order to describe β (magnification).

FIG. 4 is a diagram when a reference sign is added to each composing element in FIG. 3. The meaning of each reference sign is as follows.

I: size of virtual image in horizontal direction (mm)

O: size of real image (object) in horizontal direction (mm)

W: distance between center of eyeball and real image in front view direction of user (mm)

dW: distance between real image and virtual image in front view direction of user (mm)

H: half value of pupil distance (mm)

h: amount of deviation between virtual image and real image in horizontal direction (mm)

L: distance between center of eyeball and center portion of real image (mm)

P: amount of base in prism ($\Delta$)

Further, 1$\Delta$ means that light deviates 1 cm in the horizontal direction at 1 m ahead of the prism after light passes through the prism. With respect to only (Equation 1) to (Equation 8), the amount of prism has a positive value in the case of a base in prism, and a negative value in the case of a base out prism.

h (amount of deviation) has a same sign as the later mentioned amount of inset, but the meaning of h is different from that of the amount of inset. With respect to only (Equation 1) to (Equation 8), h is defined as the amount of deviation between the virtual image and the real image in the horizontal direction.

First in FIG. 4, the following equation is established.

$$I:O=W+dW:W \qquad \text{(Equation 1)}$$

(Equation 1) is transformed into the following equation.

$$I/O=1+dW/W \qquad \text{(Equation 2)}$$

If $\beta$ is a magnification (=I/O), (Equation 2) becomes as follows.

$$\beta=1+dW/W \qquad \text{(Equation 3)}$$

On the other hand, P can be derived as follows based on the Prentice's formula.

$$P = (h/10)[\text{cm}]/(L/1000)[\text{m}] \qquad \text{(Equation 4)}$$
$$= 100*h/L$$

(Equation 4) is transformed to determine h as follows, assuming that L$\approx$W.

$$h=W*P/100 \qquad \text{(Equation 5)}$$

H and h have the following relationship.

$$H:h=W+dW:dW \qquad \text{(Equation 6)}$$

(Equation 6) is transformed as follows.

$$dW = W*h/(H-h) \quad \text{(Equation 7)}$$

The following equation can be derived from (Equation 3) and (Equation 7).

$$\beta = H/(H-h) = H/\{H - W*P/100\} \quad \text{(Equation 8)}$$

The magnification can be estimated using (Equation 8), although this is an exemplary case.

For example, if H=32 mm, W=400 mm and P=1Δ, then β=1.14. This means that the user can visually perceive the object about 10% larger by wearing this pair of spectacle lenses. (Equation 8) was derived using only geometric relationships, hence the image to be perceived by fusion cannot be fully explained by this equation, but at least the relationship on enlargement/reduction of an image can be explained.

The above description focuses on the technical idea of this invention. Now a pair of spectacle lenses, which is a specific example of this invention, is described.

<2. Pair of Spectacle Lenses for Binocular Vision>

An aspect of this embodiment is a pair of spectacle lenses for binocular vision. A pair of spectacle lenses are used because, as mentioned above, parallax is intentionally generated in both lines of sight, so that the user perceives a virtual image which is a magnified image of an object by skillfully using the fusion generated by the binocular vision. Each spectacle lens is a lens constituted by an object side surface (outer surface) and an eyeball side surface (inner surface). With regard to a configuration of the lens, unless otherwise specified, a configuration of a publically known spectacle lens may be used.

The pair of spectacle lenses of this embodiment is not especially limited, as long as it is for vision correction. In other words, the pair of spectacle lenses may be a single vision lens in which one region to see an object at a predetermined distance is formed, a single vision lens in which power changes as the position in the lens departs from this region, a bi-focal lens in which a small lens is formed, or a progressive power lens which includes a portion where power changes continuously (so-called progressive portion) may be used.

The progressive power lens may be a progressive multi-focal lens which includes a distance portion and a near portion, or a progressive multifocal lens which includes not the distance portion but an intermediate portion (e.g. portion to view an object from 400 cm to 40 cm), and a near portion (so called "occupational lens"), or may be a progressive multifocal lens which includes a near portion and another near portion for viewing an object even closer (e.g. less than a 100 cm distance) (so called "near vision lens").

Each spectacle lens of this embodiment includes a portion for viewing an object at a finite distance. This is because the needs to see a magnified object is increased when an object at a finite distance is seen, as described above, but also because the above mentioned SILO phenomenon occurs based on the degree of convergence. In other words, in the case of a spectacle lens used only for distance vision, correlation between the lens and the SILO phenomenon becomes weaker, and the above mentioned magnified vision effect of the virtual image may not be expected, hence each spectacle lens of this embodiment includes a portion for viewing an object at a finite distance.

The above mentioned spectacle lenses may have a shape reflecting an astigmatic power based on an astigmatic prescription, or may be spectacle lenses in which a prescription prism, to correct user' symptoms, such as heterotropia, heterophoria and fixation disparity, is disposed independently from the base in prism.

(2-1. Configuration of Spectacle Lens)

One major characteristic of this embodiment is that when the user sees an object via the portion for viewing an object at a finite distance, the shape of a base in prism formed in this portion directs the line of sight to a direction that is different from the object. In other words, this portion has the shape of the base in prism, which directs the ray along the line of sight to a direction that is different from this object.

The portion for viewing an object at a finite distance is preferably a near portion. This is because convergence is generated by near vision, and the virtual image can be magnified and perceived with more certainty, as mentioned above. In the following, a case where this portion is the near portion is described as an example.

However, needless to say, this portion may be an intermediate portion instead of a near portion, or may be a near portion for viewing an object even closer.

In each spectacle lens including the base in prism, the shape of the portion for viewing an object at a finite distance is not especially limited. In other words, the base in prism may be formed by evenly inclining the entire shape of the inner surface. The base in prism may be formed by evenly inclining a part of the inner surface only for the near portion. Further, the base in prism may be added to the entire shape of the inner surface so that the amount of the prism changes continuously, or such a base in prism may be added to the near portion.

In the case of a single vision lens which includes a portion where power changes continuously, or a progressive power lens which includes a distance portion, a near portion and a progressive portion, there is a preferred mode to add a base in prism. This mode is described in [Embodiment 2].

The amount of the base in prism to be provided is not especially limited, as long as the virtual image is magnified and perceived larger than the real image in binocular vision.

Each of a pair of spectacle lenses for binocular vision may have a base in prism of which the amount of prism is different from the other, as long as a magnified view is possible by fusion in the binocular vision. However, in terms of balance of the eyes in the binocular vision, it is preferable that each spectacle lens includes the shape of the base in prism, of which difference in the amount of prism from the other spectacle lens is 0.25Δ or less (more preferably the same amount).

In the following, a case where the amount of the base in prism of each spectacle lens is the same is described. A single spectacle lens is primarily described in the present description, but unless otherwise specified, the content of the following description can be applied equally to the spectacle lens for the left eye and the spectacle lens for the right eye.

(2-2. Difference from Prior Art)

In PTL 1 and in any other document providing a prism in a spectacle lens, the purpose of providing the prism is to direct the line of sight to an object. Since the aim is to enable the user to clearly view the object, this is the main purpose of providing the prism regardless the types of spectacle lens, such as a single vision lens and a progressive power lens. At least, a spectacle lens, which includes a prism that is different from a prescription prism, to intentionally direct the line of sight to a direction different from the object, is still unknown.

In this embodiment, as mentioned above however, a base in prism is provided to each of the pair of spectacle lenses, and parallax is intentionally generated in the lines of sight of both eyes, so that the SILO phenomena is implemented in the spectacle lenses. Thereby the user can perceive a virtual image that is magnified compared with the real image.

(2-3. Determination Method)

Whether the base in prism according to this embodiment is provided in a spectacle lens or not can be unequivocally determined. Without exception, a lens bag on which prescription values are written is always attached to the spectacle lens delivered to a user. The information on the prescription prism is also written on the lens bag. If this information is not written on the lens bag, the information is inscribed directly on the spectacle lens as marks.

If the prism in the spectacle lens is found as a base in prism after the amount of the prism is examined, and has a different value from the prescription prism written on the lens bag, then the actual line of sight direction is different from the line of sight direction of the prescribed prism, thereby the technical idea of the present invention is reflected in this spectacle lens.

[Embodiment 2]

<3. Preferred Example of Shape of Base in Prism>

In this embodiment, a preferred example of the shape of the base in prism is primarily described. Here redundant content of [Embodiment 1] is omitted.

This embodiment is described in the following sequence.

3-1. Handling of divergence in front vision
3-2. Handling of unintended base out prism The spectacle lens according to this embodiment is not especially limited, as long as the spectacle lens has a portion in which power changes continuously (progressive portion). For example, the spectacle lens of this embodiment may be a progressive multifocal lens which includes a distance portion for viewing a distant area (e.g. infinity to 400 cm), and a near portion for viewing a near area (e.g. 100 cm or less), or a single vision lens which includes plus power and of which power changes while moving away from one region to view an object at a predetermined distance. Needless to say, the spectacle lens of this embodiment may be an outer surface progressive lens having a progressive surface on the outer surface, an inner surface progressive lens having a progressive surface on the inner surface, or a double-sided progressive lens where a change in power is distributed on both surfaces.

In the following description, an inner surface progressive lens (outer surface is a spherical surface) as the progressive multifocal lens is described as an example.

(3-1. Handling of Divergence in Front Vision)

As mentioned above, the shape of the portion for viewing an object at a finite distance in each spectacle lens, which includes a base in prism, is not especially limited.

However, in the case of the progressive power lens, it is preferable to provide the above mentioned base in prism in a position lower than the distance power measurement point, the prism power measurement point, or the fitting point, rather than by adding a base in prism evenly. The base in prism of this embodiment is for certain a prism provided independently from a prescription prism. Unlike a conventional spectral lens, parallax is generated in the binocular vision because of this base in prism, as mentioned above.

The reason why the above example is preferable follows.

Figure 5:
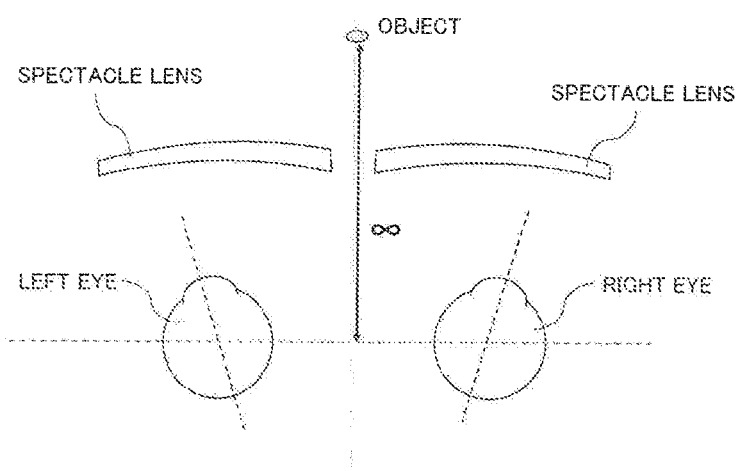
FIG. 5 is a schematic top view depicting a state when the user sees from a distance, where the lines of sight normally become parallel and natural if the spectacle lenses are not worn, but the base in prisms force the lines of sight of the user to diverge excessively.

A case of evenly adding the base in prism to all the portions of the progressive power lens, which includes the distance portion, the near portion and the progressive portion, is considered as an example. In this case, when the user sees an object at a distance through the distance portion of the spectacle lens, as illustrated in FIG. 5, the lines of sight would naturally be parallel if the user were not wearing the spectacle lenses, but the lines of sight of the user are forced to excessively diverge because of the presence of the base in prism. In other words, in the above case, the above mentioned effect of perceiving the magnified virtual image—in other words, an effect of this invention—can be surely exhibited when the user sees an object at a finite distance through the near portion or the progressive portion. However, when the user sees the object through the distance portion, an unintentional divergence is generated, and an unnecessary fatigue may be experienced.

However, if the base in prism is disposed in a position lower than the distance power measurement point, the prism power measurement point or the fitting point, parallax is not generated in the binocular vision in the distance portion where the two lines of sight are parallel. As a result, the two lines of sight are naturally parallel when the user sees from a distance. On the other hand, when the user sees an object at a finite distance, a magnified virtual image of the object can be perceived.

(3-2. Handling of Unintended Base Out Prism)

In a progressive multifocal lens, the main line of sight or the meridian (hereafter called "main line of sight"), which is a reference when the power changes continuously, is set.

The main line of sight in this description refers to a line formed by points where the line of sight passes through in the spectacle lens when the user, wearing the spectacle lens, moves the lines of sight from above to below. This main line of sight is the base when the spectacle lens is designed.

As depicted in FIG. 1 and the like of PTL1, the main line of sight, when viewed from the upper part to the lower part of the spectacle lens, is deflected toward the nose of the user (inner horizontal direction) in the lower part of the spectacle lens. This is caused by the movement of the eyeballs toward the direction of the nose simultaneously when the lines of sight move from the upper part to the lower part (i.e., convergence eye movement). As the line of sight moves to a lower part, the line of sight is deflected inward, and the main line of sight also changes accordingly.

The main line of sight that is deflected inward means that the main line of sight is not always on the vertical line connecting the upper vertex and the lower vertex of the spectacle lens when seeing the front of the spectacle lens. As a result, a prismatic effect, which the spectacle lens should not have, is exhibited.

This is described with reference to FIG. 6. The distribution map on the left of FIG. 6 indicates the surface mean power in a spectacle lens, so-called outer surface progressive lens, of which object side surface (outer surface) is a progressive surface and the eyeball side surface (inner surface) is a spherical surface, when the spherical power (S) is 0.00 D, the cylinder power (C) is 0.00 D, and the addition power (ADD) is 3.50 D. A horizontal sectional shape of the spectacle lens at each corresponding position of the distribution map is illustrated on the right side of the distribution map.

The point F is a point which is on the main line of sight, and exists in the distance portion (e.g. distance power measurement point). In the cross-sectional view of the spectacle lens sectioned at the horizontal line A-A' which passes through the point F, the gradient of the tangential line on the outer surface and the gradient of the tangential line on the inner surface are approximately the same at the point F.

On the other hand, the point N is a point which is on the main line of sight, and exists in the near portion (e.g. near power measurement point). As mentioned above, the main line of sight deflects toward the nose (inner horizontal direction) in the near portion due to the convergence eye movement. As a result, in the cross-sectional view of the spectacle lens sectioned at the horizontal line B-B' which passes through the point N, the point N deviates from the vertex of the spectacle lens in the cross-sectional view, and the gradient of the tangential line on the outer surface and the gradient of the tangential line on the inner surface become different at the point N. Because of the difference in gradients, the ray along the line of sight is refracted. In other words, in this example, if the main line of sight is set considering convergence, an unintended prism is generated on the main line of sight in the near portion of the spectacle lens.

Figure 7:
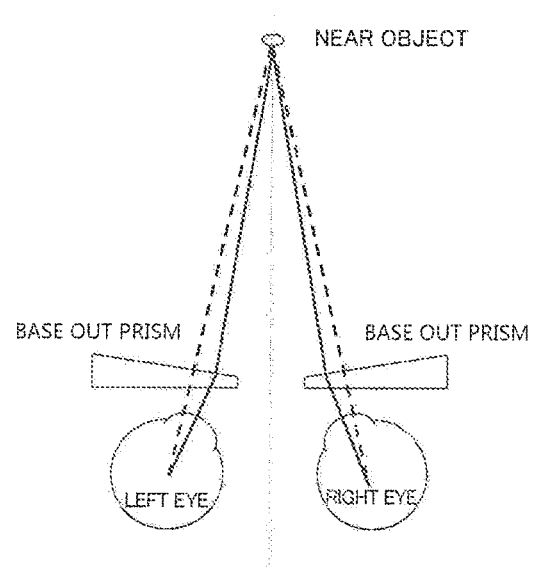
FIG. 7 is a schematic top view depicting an influence which the user experiences from the base out prisms.

What's worse is that this unintended prism becomes a base out prism which refracts the ray along the line of sight toward the ear of the user (outer horizontal direction). If an unintended base out prism is generated, the eyes of the user are subject to more intense convergence. This state is described with reference to FIG. 7. FIG. 7 is a schematic top view depicting an influence from the base out prism on the user. When the user sees a near object, the eyeballs need not move excessively inward if base out prisms are not generated, as indicated by the broken lines. However, since the base out prisms are generated, the lines of sight must be like the solid lines, in order to visually perceive the object. Then both eyeballs must excessively move inward, compared with the lines of sight indicated by the broken lines. This means that the eyes of the user are subject to more intense convergence. And this additional convergence may cause unnecessary fatigue to the user.

So far, in a conventional spectacle lens which includes a portion where power changes continuously (e.g. progressive portion), the critical point focuses on accommodating eyes by the user in accordance with the distance between the object in front of the eyes of the user and the user (i.e., the distance in the front-back directions). However, as a result of earnest studies by the inventors, it became known that the convergence of the user (i.e., the distance in the horizontal direction or left-right directions) may considerably influence user' comfort when wearing spectacle lenses.

Figure 6:
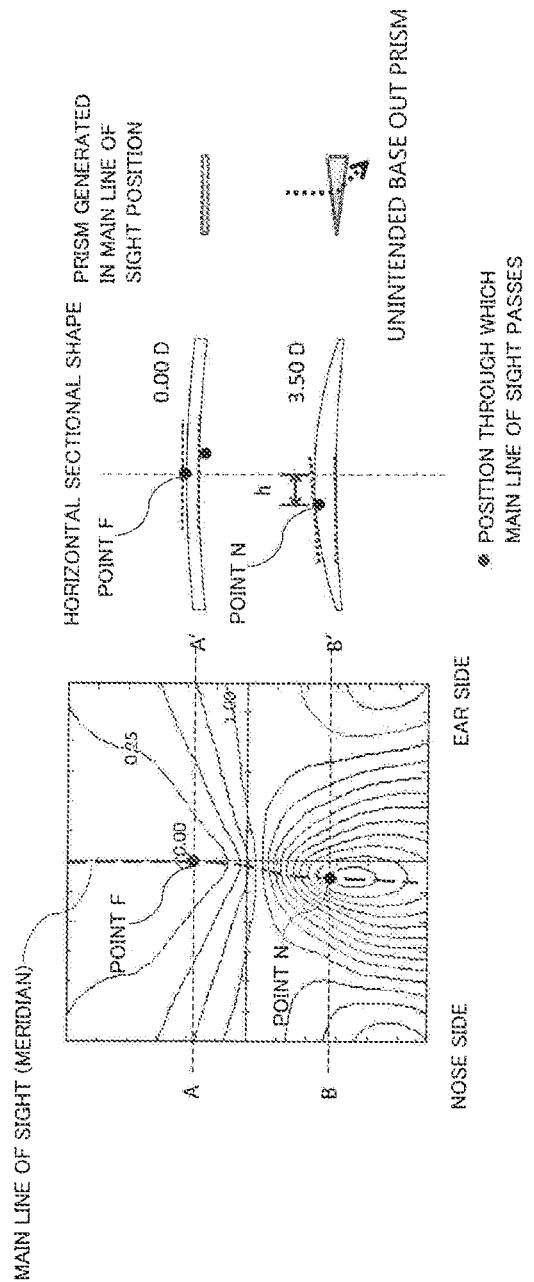
FIG. 6 The distribution map on the left of FIG. 6 indicates the surface mean power in a spectacle lens, so-called outer surface progressive lens, of which the object side surface (outer surface) is a progressive surface and the eyeball side surface (inner surface) is a spherical surface, when the spherical power (S) is 0.00 D, the cylinder power (C) is 0.00 D, and the addition power (ADD) is 3.50 D. The horizontal sectional shape of the spectacle lens in each corresponding portion of the distribution maps is illustrated on the right side of the distribution map.

In FIG. 6, the outer surface progressive lens is illustrated as an example, but plus power is added from the upper part to the lower part, even in the case of an inner surface progressive lens where the progressive surface is on the inner surface, a double-sided progressive lens where the change in power is distributed on both surfaces, or a double-sided integrated progressive lens where optimum design is implemented on a double-sided progressive lens according to the characteristics of the eyes. Therefore unintended base out prisms can be generated in the portions through which the main line of sight, influenced by convergence of the user, passes through, even in the inner surface progressive lens, just like the case illustrated in FIG. 6, and this can also occur even in a single vision lens having plus power, where power changes while moving away from one region to view an object at a predetermined distance.

Now how the amount of convergence of an eyeball of the user is changed by the amount of unintended base out prism is described.

For example, an approximate amount of convergence I (mm) of the user is determined using the following equation.

$$I = H/\{1 \times (1/V - D/1000) + 1\}$$ (Equation 9)

Here H is a monocular pupil distance (mm), 1 is a target distance (mm), V is a distance between vertexes (mm), and D is a power of a lens in the horizontal direction (D).

On the other hand, the unintended base out prism can be estimated by the following equation (Equation 10) based on a variation of the Prentice's formula. Details on the variation are described using the following (Equations 11-13).

$$P = ADD * h/10$$ (Equation 10)

Here P is an amount of the prism ($\Delta$), h is a horizontal distance (mm) between the vertex of the horizontal sectional shape of the spectacle lens to a point on the main line of sight (e.g. point N in FIG. 6), and the absolute value of h corresponds to the amount of inset in the spectacle lens. The sign of h is positive on the nose side, and negative on the ear side when viewed from the vertex of the spectacle lens in the horizontal sectional view (vertical line (perpendicular line) connecting the upper vertex and the lower vertex of the spectral lens in this example), but a plus sign is hereafter omitted. The vertexes in the horizontal sectional shape of the spectral lens are defined as points where a plane, which is orthogonal to the line passing through two engraving marks and which includes a mid-point of a line segment connecting the two engraving marks, crosses with the horizontal sectional shape. h at the point N in FIG. 6 is 2.51 mm.

As (Equation 10) shows, the amount of the unintended base out prism increases as the addition power (ADD) increases.

In the case of a user who wears a single vision lens, of which S is 0.00 (distance prescription power), the amount of convergence required to see a near object 35 cm ahead is estimated as 2.29 mm using (Equation 9), when the monocular pupil distance is 32 mm and the distance between the vertexes is 27 mm. On the other hand, when the same user wears a progressive power lens of which S is 0.00 and ADD is 3.50 D, the amount of convergence required to see the near object 35 cm ahead is 2.51 mm if the power in the near portion of the lens in the horizontal direction is approximated as 3.50 D.

In other words, if ADD is 3.50 D, the amount of an unintended base out prism increases compared with the case of no addition power, and as a result, the eyeballs must converge about 10% more.

Therefore, the present inventors discovered a new problem to provide a technology for spectacle lenses that suppress unnecessary convergence, in addition to providing a magnified visual perception of an object described in the above embodiment.

To solve the above problem, the present inventors performed diligent studies. As a result, the inventors conceived of a configuration to provide a base in prism, which refracts a ray along the line of sight toward the nose of the user (inner horizontal direction), to the spectacle lens in order to cancel at least a part of the unintended base out prism.

According to the configuration which was conceived of in this embodiment, a shape of a base in prism to cancel at least a part of a base out prism, which may be generated in a portion of the progressive portion where the main line of sight, for which convergence of the user has been considered, passes, is provided in this portion.

As mentioned above, the main line of sight is a line formed by points through which the line of sight passes in the spectacle lens. In this embodiment, however, the main line of sight in a progressive multifocal lens is defined as a line connecting the distance power measurement point and the near power measurement point (later mentioned in FIG. 8) for convenience. This definition can also be applied to determine the position of the main line of sight in an actual lens.

The target to be canceled in this embodiment is still "the base out prism, which may be generated in a portion of the spectacle lens where the power changes continuously, and where the main line of sight, for which the convergence of the user has been considered, passes". In other words, the shape of the main line of sight (regardless a straight line or a curved line) is not limited as long as conditions are satisfied where the main line of sight is not a vertical line (perpendicular line) connecting the upper vertex and the lower vertex of the lens. Considering that the shape of the main line of sight may change depending on the user, it is unnecessary to unequivocally specify the shape and position of the main line of sight itself for a lens constituting the spectacle lens of this embodiment.

Returning to the main topic, in this embodiment, even if an unintended base out prism is generated due to the deflection of the main line of sight toward the nose, the negative influence of the base out prism can be reduced by designing the spectacle lens to have a shape which allows to function as the base in prism in advance. In other words, by designing the shape of the spectacle lens to have a shape which allows to function as the base in prism in advance, the unintended base out prism, which may be generated due to convergence, can be cancelled out.

The above mentioned base in prism can suppress unnecessary convergence more than prior art if only a part of the base out prism can be cancelled. The following is merely an example, but for instance, 50% of the base out prism may be corrected by considering a balance with aberration. However, needless to say, the higher the ratio of cancelling the base out prism the better. It is preferable that the base in prism cancels 80% or more (preferably 90% or more, ideally 95% or more) of the base out prism.

The amount of the unintended base out prism which is generated in a portion where the main line of sight, for which the convergence of the user has been considered, passes, can be estimated using the Prentice's formula (Equation 10). The amount of the base in prism can be determined in accordance with the estimated amount of the base out prism, and the spectacle lens of this embodiment can be implemented by providing this amount of the base in prism to the spectacle lens.

Following is a description when the above content can be defined by the equations.

Figure 8:
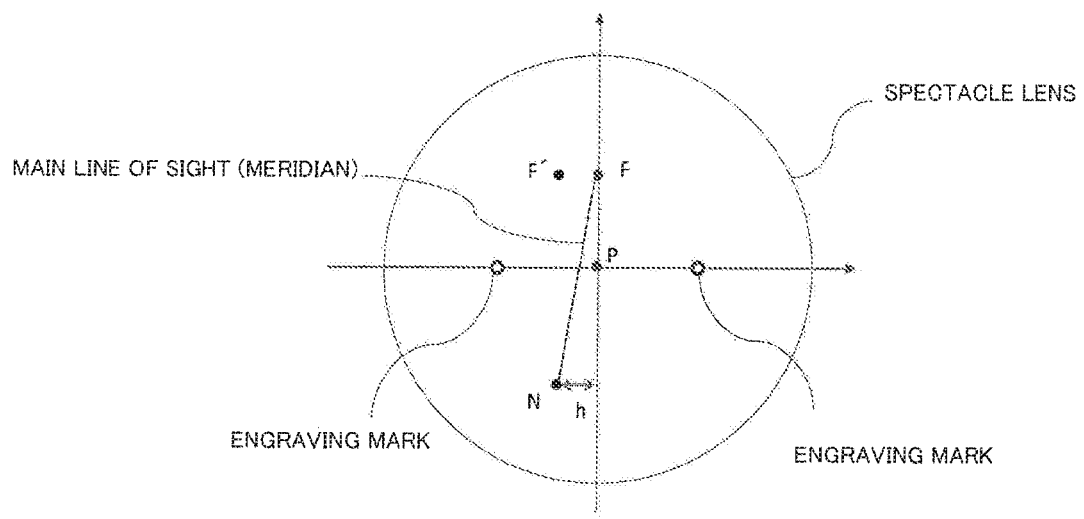
FIG. 8 is a schematic plan view of the spectacle lens according to this embodiment.

FIG. 8 is a schematic plan view of the spectacle lens according to this embodiment. The point F is the distance power measurement point, and the point N is the near power measurement point. h is the horizontal distance (mm) between the vertex of the horizontal sectional shape of the spectacle lens and a point on the main line of sight (e.g. point N in FIG. 6), as mentioned above, i.e. the distance (mm) between the point F and the point N in the horizontal direction. The absolute value of h corresponds to the amount of inset in the spectacle lens. The point F' is a point that is distant from the point F by the distance h in the horizontal direction. In this embodiment, the amount of prism in the horizontal direction in the distance portion is measured at the point F', and the amount of prism in the horizontal direction in the near portion is measured at the point N. Thereby the prismatic effect that is generated by the distance power, which is prescribed separately from the addition power, can be suppressed. For this reason, in this embodiment, the equations to estimate the unintended base out prism are established using the amount of prism between the point F' and the point N.

First the amount of prism is determined at the point F' and the point N. For this, the above mentioned Prentice's formula (Equation 10) is applied as follows.

$$P_F = D_F * h/10 \quad \text{(Equation 11)}$$

$$P_N = D_N * h/10 \quad \text{(Equation 12)}$$

Here $P_F$ denotes an amount of prism ($\Delta$) at the point F' and the point F, and $P_N$ denotes an amount of prism ($\Delta$) at the point N. The amount of prism is positive in the case of the base out prism, and negative in the case of the base in prism. In this description, however, the sign may be omitted when indicating either base in prism or base out prism. In this case, "the base out prism increases" means that the degree of the base out prism increases, and also means that "the absolute value of the amount of the base out prism increases".

$D_F$ denotes the power (D) of the distance portion in the horizontal direction, and $D_N$ denotes the power (D) of the near portion in the horizontal direction.

Here the unintended base out prism is given by $(P_N - P_F)$. Therefore in a conventional progressive multifocal lens which does not include a special prism, the following equation is established.

$$P_N - P_F = (D_N * h/10) - (D_F * h/10) \quad \text{(Equation 13)}$$
$$= (D_N * D_F) * h/10$$
$$= ADD * h/10$$

The amount of the unintended base out prism ($\Delta$) can be estimated by (ADD*h/10). In other words, if $(P_N - P_F)$, measured for an actual spectacle lens, is smaller than (ADD*h/10), this means that at least a part of the unintended base out prism has been cancelled. As a result, the spectacle lens of this embodiment can be specified by the following equation.

$$P_N - P_F < ADD * h/10 \quad \text{(Equation 14)}$$

In addition to (Equation 14), it is preferable to satisfy the following (Equation 15) as well.

$$|P_N - P_F - ADD * h/10| \geq 0.25 \quad \text{(Equation 15)}$$

The left hand side of (Equation 15) indicates the "degree of reduction of the unintended base out prism caused by addition of the base in prism". In other words, (Equation 15) indicates that the unintended base out prism has been cancelled by one step (0.25$\Delta$) or more of the prescription prism. It is preferable that the left hand side of (Equation 15) is a value exceeding 0.25$\Delta$.

If "a portion where the main line of sight, for which convergence of the user has been considered, passes" (hereafter merely referred to as "portion $\alpha$"), is specified in the spectacle lens according to this invention, although the following is merely an example, there is no problem to specify this portion as a portion near a line segment connecting the distance power measurement point F and the near power measurement point N, for example.

A specific shape of the spectacle lens in the portion $\alpha$ (specific shape of the inner surface in the portion $\alpha$ in this embodiment) is preferably as follows. In at least a part of the portion $\alpha$, at least any one of the shapes of the object side surface and the eyeball side surface of the spectacle lens is continuously (gradually) twisted toward the lower part of the spectacle lens in the cross-sectional view of the portion $\alpha$ in the horizontal direction, such that the base in prism increase in the lower part of the spectacle lens. This means that parallax in the binocular vision is continuously (gradually) increased.

Although details is described later in the section of examples, compared with the optical layout of the progressive surface before considering the unintended base out prism (later mentioned Comparative example 3 in FIG. 13(a) and FIG. 13(b)), the shape of the inner surface of the spectacle lens in the cross-sectional view in the horizontal direction is continuously twisted toward the lower part of the spectacle lens, in a part lower than the distance power measurement point F or the prism power measurement point P in Examples 3 to 5, and of these, the optical layout of Example 3 is illustrated in FIG. 20(a) and FIG. 20(b) for explanatory purposes.

In comparing FIG. 20(b) of Example 3 and FIG. 13(b) of Comparative example 3, the surface mean power is not very different. This is because even if the prism is added, the progressive surface is formed in the state of simply continuously changing the gradient of the tangential line at each point on the main line of sight in the horizontal sectional shape from the upper part to the lower part of the lens surface, and the mean power itself generated by the progressive surface does not change very much. However, obviously because the surface shape is continuously twisted, the distribution map of the surface astigmatism depicted in FIG. 20(a) slightly deviates downward on the nose side in Example 3. As a result, the distribution maps of the surface astigmatism are considerably different between Example 3 and Comparative example 3.

Example 6 is the case where the shape (curve) of the spectacle lens of Example 3 is deformed on the side of the portion α, and Examples 7 and 8 are the cases where the manner of twisting the inner surface shape is changed under the same design conditions as Example 6. Hereafter, Example 6 is used for description. In Example 6, the curve itself is deformed on the side of the surface of the spectacle lens of Example 3, so that the amount of the base in prism on the side of the portion α can be kept low. Therefore the surface astigmatism of the layout similar to the distribution map of the surface astigmatism of the progressive surface before considering the unintended base out prism (Comparative example 3, FIG. 13(a)), can be acquired in the distribution map of the surface astigmatism in Example 6 (FIG. 23(a)). On the other hand, the near portion inclines toward the nose in the lower direction in the distribution map of the surface mean power in Example 6 (FIG. 23(b)), since the curve itself was deformed on the side of the surface.

The above content is described below in detail.

First the content according to Example 3 is described. As mentioned above, the shape to generate the base in prism must be provided to the spectacle lens in order to cancel the unintended base out prism. To implement this, a difference must be generated between the gradient of the tangential line of the outer surface and the gradient of the tangential line of the inner surface at a point on the main line of sight, as depicted in FIG. 6, and inclination must be generated in the direction to generate the base in prism.

Therefore according to a preferred example of this embodiment, the shape of the inner surface of the spectacle lens in the cross-sectional view in the horizontal direction is continuously twisted in the lower direction of the spectral lens in the part lower than the distance power measurement point F or the prism power measurement point P in the portion α, so that a difference is generated between the gradient of the tangential line of the outer surface and the gradient of the tangential line of the inner surface at a point on the main line of sight, as depicted in FIG. 6. In this case, on the inner surface of the spectacle lens, the tangential line at the point on the main line of sight is set to be lower on the nose side and higher on the ear side in the cross-sectional view in the horizontal direction. Then the base in prism can be continuously increased in the lower direction of the spectacle lens, and such a base in prism can be provided to the spectacle lens. This twisting shape is a shape considering that the main line of sight in this embodiment is gradually deflected toward the nose in the lower direction of the spectacle lens, in which the convergence of the user is reflected.

Figure 9:
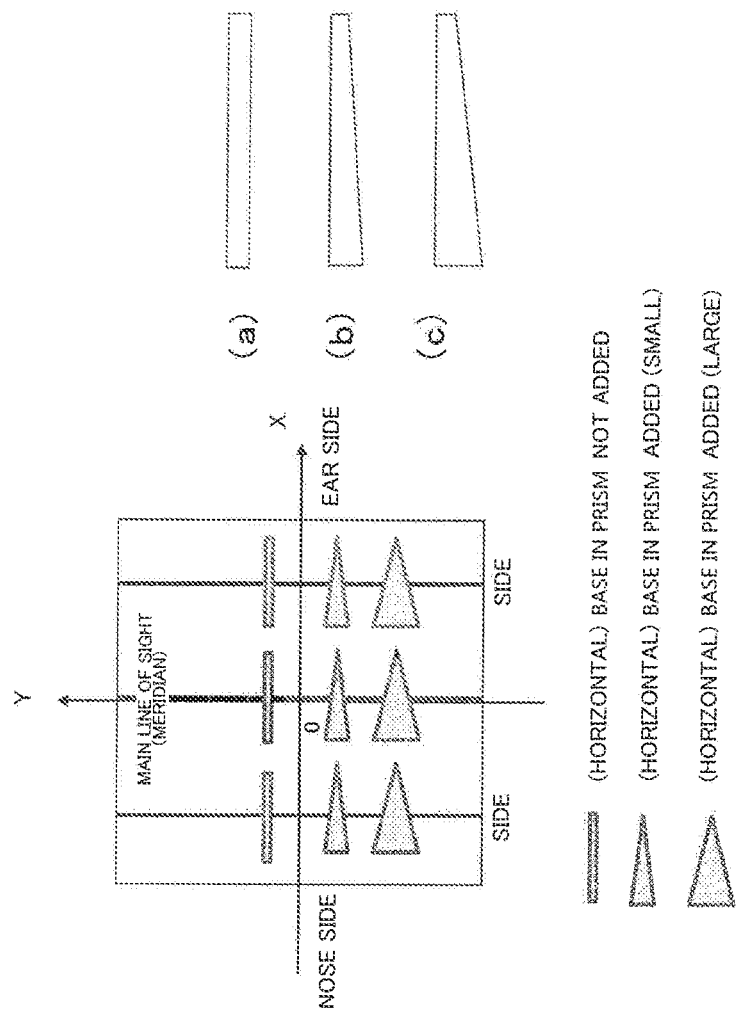
FIG. 9 is a conceptual diagram depicting the control state of the base in prisms in the portion α through which the main line of sight passes, and both sides thereof in the spectral lens according to Example 3.
Figure 10:
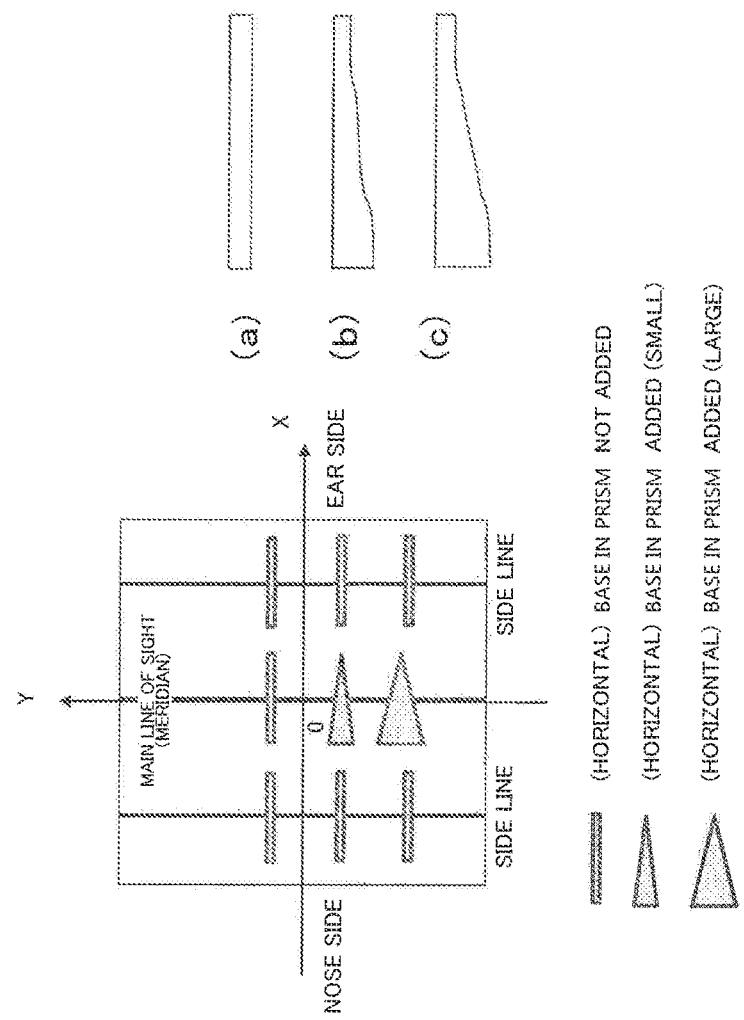
FIG. 10 is a conceptual diagram depicting the control state of the base in prisms in the portion α through which the main line of sight passes, and both sides thereof in the spectral lens according to Example 6.

The above content is a description on the portion α. The shape of the portions other than the portion α is now described with reference to FIG. 9 and FIG. 10. FIG. 9 and FIG. 10 are conceptual diagrams depicting: the control state of the base in prism in the portion α through which the main line of sight passes in the spectacle lens and both sides thereof. To simplify description, the main line of sight is indicated as a straight line in FIG. 9 and FIG. 10. This visually presents the main line of sight along the Y axis, however this does not mean that the main line of sight is actually extending as a straight line in the vertical direction.

In this example of the embodiment, the shape of the base in prism is formed in the outer horizontal direction and the inner horizontal direction, when viewed from the portion α in the spectacle lens of this embodiment. This is because the base in prism is provided to the portion α, such that the sides of the portion α has the shape of the base in prism as well. In the case of FIG. 9, the shape of the entire inner surface of the spectacle lens in the cross-sectional view in the horizontal direction is continuously twisted in the lower direction of the spectacle lens, as in FIG. 9(a)→FIG. 9(b) → FIG. 9(c). The processing of the spectacle lens to form this shape is relatively easy, because the base in prism is provided from edge to edge of the lens surface in the horizontal direction. As a result, if this configuration is used, the manufacturing efficiency of the spectacle lens improves.

The above content corresponds to Examples 3 to 5 which will be described later.

Figure 26:
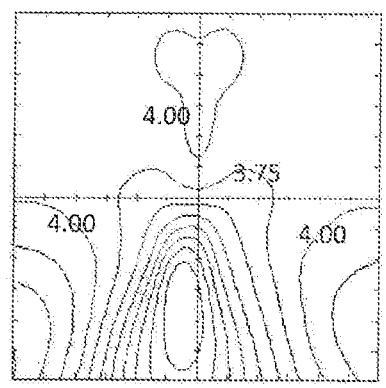
FIG. 26 is a set of diagrams depicting the surface power according to Comparative example 3, where
Figure 26:
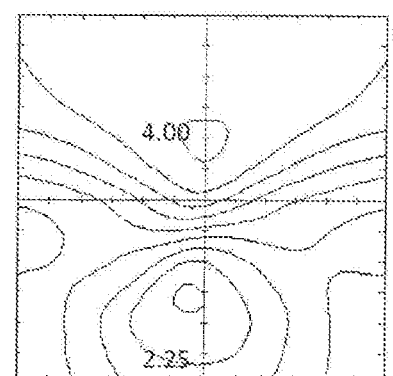

The above content may be interpreted from the point of view of the distribution of the surface power. This aspect is described below. FIG. 26 is a set of diagrams depicting the distribution of the surface power of the later mentioned Comparative example 3 (reference example, that is, the original progressive surface before the base in prism is provided), where FIG. 26(a) is a distribution map of the surface power in the horizontal direction, and FIG. 26(b) is a distribution map of the surface power in the vertical direction.

Figure 27:
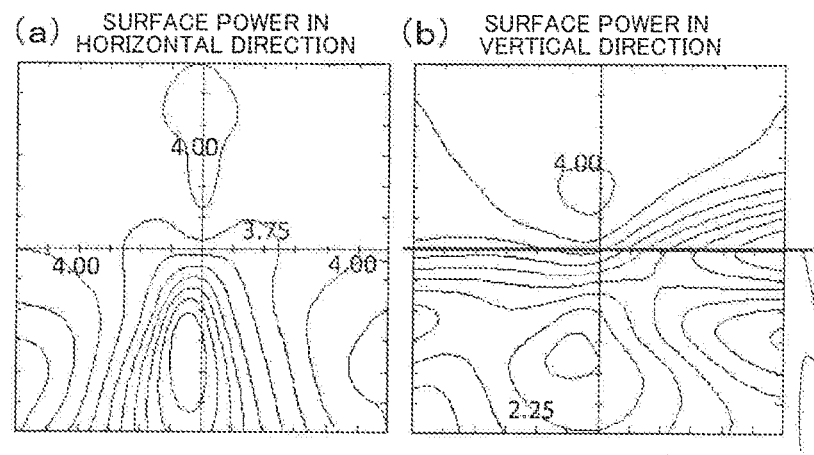
FIG. 27 is a set of diagrams depicting the distribution of a surface power according to Example 3, where
Figure 30:
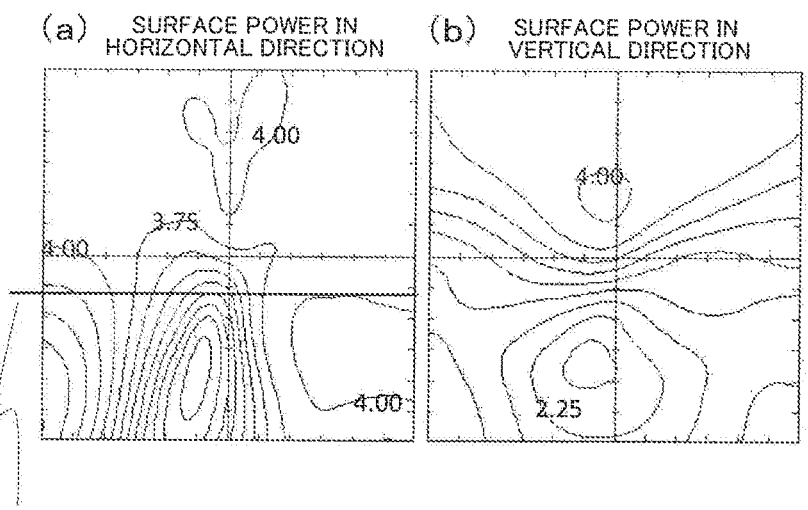
FIG. 30 is a set of diagrams depicting the distribution of a surface power according to Example 6, where

Similar diagrams are also provided for the later mentioned Example 3 and Example 6 in FIG. 27 and FIG. 30 respectively.

The distribution of the surface power in the horizontal direction and in the vertical direction are determined as follows.

When there is a surface, the maximum and minimum curvatures and the directions thereof at each point on the surface are unequivocally determined. Since the surface power is determined by multiplying the curvature by a coefficient of the refractive index, the maximum and minimum surface powers and the directions thereof at each point on the surface are unequivocally determined. If the maximum and minimum surface powers here are Dmax and Dmin respectively, and the direction of the maximum power is AX, then the surface power in an arbitrary direction (θ) at each point is determined by the following calculation based on Euler's Formula.

$$D = D\mathrm{max} \times \mathrm{COS}^2(\theta - AX) + D\mathrm{min} \times \mathrm{SIN}^2(\theta - AX) \quad \text{(Equation 16)}$$

The surface power in the horizontal direction can be determined by substituting θ=0 or 180, and the surface power in the vertical direction can be determined by substituting θ=90 or 270 in (Equation 16). By determining the surface powers in the horizontal direction and in the vertical direction at each point on the surface like this, the diagrams in FIG. 21(a) and FIG. 21(b) are acquired.

(Dmax+Dmin)/2 in (Equation 16) indicates the surface mean power, and |Dmax−Dmin| indicates a surface astigmatism.

In a comparison of FIG. 26(b) which depicts the surface power in the vertical direction on the original progressive surface before the base in prism is provided, and FIG. 27(b) which depicts the distribution of the surface power in the vertical direction according to Example 3, a major difference is observed in the distributions of the surface power in the vertical direction.

In this example a major difference is not observed in the distributions of the surface power in the horizontal direction, because the base in prism is simply added in the horizontal direction in this example, and the shape of the curve of the inner surface of the spectacle lens is not changed in the horizontal direction. In the vertical direction, however, the shape of the curve is changed, and as a result, the above mentioned difference is generated.

Figure 33:
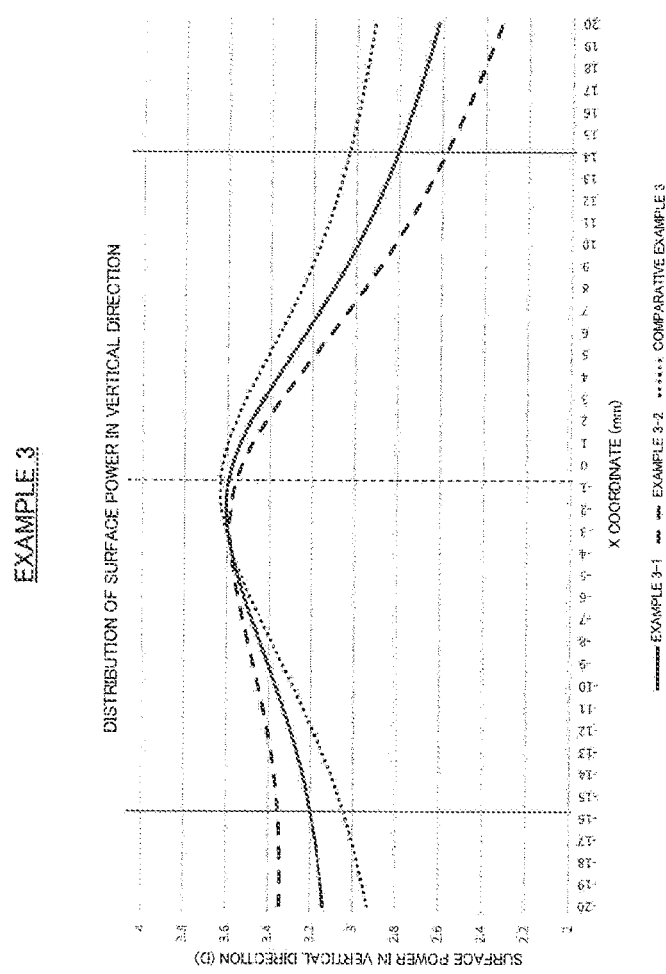
FIG. 33 is a graph, for Example 3 and Comparative example 3, plotting a surface power in the vertical direction on a line which is parallel with a horizontal reference line passing through two engraving marks imprinted in the spectacle lens in FIG. 8, and which passes through a point 3 mm higher in the vertical direction from a mid-point of a line segment connecting a distance power measurement point and a near power measurement point.

FIG. 33 is a graph plotting a surface power in the vertical direction on a horizontal line, which is parallel with the horizontal reference line passing through the two engraving marks attached to (e.g. imprinted on) the spectacle lens in FIG. 8 and which passes through a point 3 mm higher in the vertical direction from the mid-point of the line segment connecting the distance power measurement point F and the near power measurement point N. The origin of the graph in FIG. 33 is a point at which the vertical line passing through the mid-point between the two engraving marks, intersects the horizontal line. The point through which the main line of sight passes is a point shifted from the origin by 0.9 mm (−0.9 mm in this case) toward the nose in the horizontal direction.

As will be described later in Example 3, as can be seen in FIG. 33, a major difference is observed between Comparative example 3 and each example when the surface power at a position that is +15 mm from the point where the main line of sight passes and the surface power at a position that is −15 mm from the point where the main line of sight passes are compared. In other words, in the case of Comparative example 3, essentially no difference is observed in the power at the +15 mm position and power at the −15 mm position, but in the case of Example 3, the power is higher on the nose side. This is the same when the amount of the base in prism provided to the spectacle lens is 0.25Δ (Example 3-1) or is 0.50Δ (Example 3-2).

In this example, in the case of FIG. 8 the spectacle lens for the left eye, where the nose side is on the left is described as an example, but in the case of the spectacle lens for the right eye, the side on which the power is higher is the opposite. Therefore this example can be defined as follows, based on the obvious difference between Comparative example 3 and Example 3 (i.e., this embodiment).

The absolute value of the difference between the surface power values in the vertical direction in the positions ±15 mm from the point through which the main line of sight passes is 0.25 D or more (preferably 0.30 D or more, ideally 0.60 D or more) on the horizontal line which is parallel with the horizontal reference line passing through the two engraving marks and which passes through a point that is 3 mm higher in the vertical direction from the mid-point of the line segment connecting the distance power measurement point F and the near power measurement point N.

The absolute value in Example 3-1 is 0.38 D, and the absolute value in Example 3-2 is 0.76 D.

Examples 4 and 5 corresponding to this example as well may be defined as above, with changing the position of the horizontal line to determine this absolute value. For example, the following definition may be provided.

The absolute value of the difference between the surface power values in the vertical direction in the positions ±15 mm from the point through which the main line of sight passes is 0.25 D or more (preferably 0.40 D or more, ideally 0.70 D or more) on a line which is parallel with the horizontal reference line passing through the two engraving marks and which passes through the mid-point of the line segment connecting the distance power measurement point F and the near power measurement point N.

The absolute value of the difference between the surface power values in the vertical direction in the positions ±15 mm from the point through which the main line of sight passes is 0.25 D or more (preferably 0.40 D or more, ideally 0.80 D or more) on a line which is parallel with the horizontal reference line passing through the two engraving marks and which passes through a point that is 3 mm lower in the vertical direction from the mid-point of the line segment connecting the distance power measurement point F and the near power measurement point N.

Each of the above definitions may be used by itself, but it is preferable to appropriately combine these definitions so that the characteristics of this example are enhanced.

For another example of the present embodiment, the amount of the base in prism on the sides of the portion α can be suppressed, as illustrated in FIG. 10. In concrete terms, the amount of the added base in prism is reduced from the portion α in the outer horizontal direction and in the inner horizontal direction.

It is true that a base in prism should be provided to cancel an unintended base out prism, but the prism in the horizontal direction may be perceived as a distortion on the sides of the portion α. To prevent this, the amount of the prism (base in prism) in the horizontal direction must be minimized on the sides of the portion α. In other words, it is necessary to twist the entire surface shape in the horizontal direction, as in the above example, and then to untwist the sides of the portion α to return to the original state. In this example, the amount of the base in prism is controlled by changing the power of the spectacle lens (i.e., further changing the surface shape). In concrete terms, in the case of FIG. 10 the curve itself is changed in a horizontal line on the sides of the lens surface, as in FIG. 10(a)→FIG. 10(b)→FIG. 10(c). According to this configuration, a spectacle lens in which distortion on the sides is reduced while suppressing the generation of an unintended base out prism, can be provided.

The above content corresponds to Examples 6 to 8 which will be described later.

Just like the content corresponding to Example 3 described above, the above content can be interpreted from the point of view of the distribution of the surface power. This aspect is described below. FIG. 30 is a set of diagrams depicting the distribution of the surface power of the later mentioned Example 6, where FIG. 30(a) is a distribution map of the surface power in the horizontal direction, and FIG. 30(b) is a distribution map of the surface power in the vertical direction.

In comparing FIG. 26(a) which depicts the surface power in the horizontal direction on the original progressive surface before the base in prism is provided, and FIG. 30(a)

which depicts the distribution of the surface power in the horizontal direction according to Example 6, a major difference is observed in the distribution of the surface power in the horizontal direction. This is because the shape of the curve itself of the inner surface of the spectral lens is changed in the horizontal direction.

Figure 36:
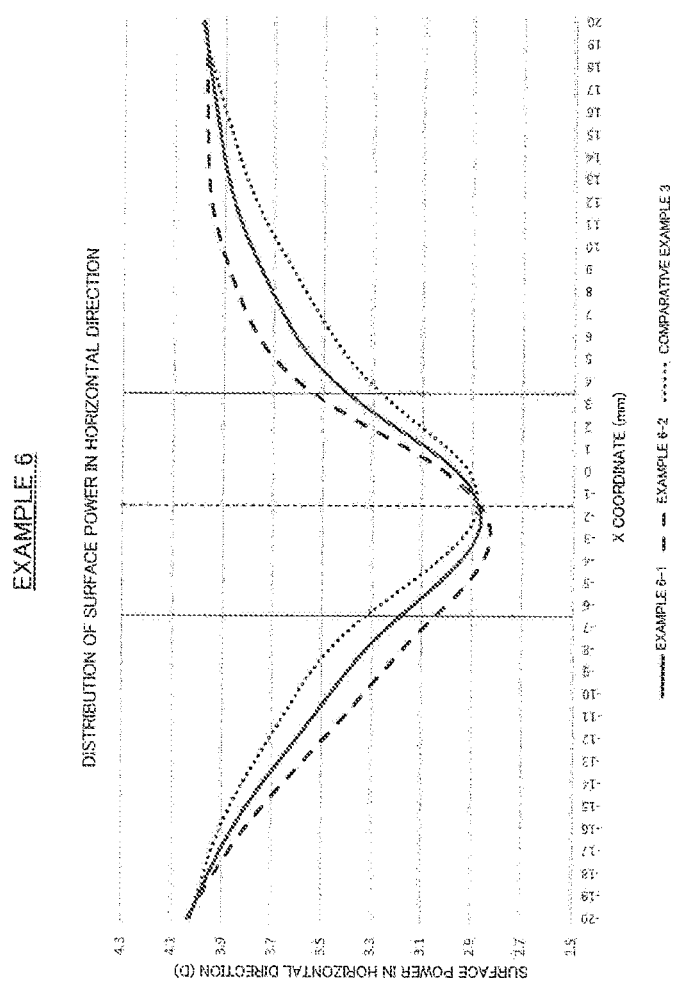
FIG. 36 is a graph, for Example 6 and Comparative example 3, plotting a surface power in a horizontal direction on a line which is parallel with a horizontal reference line passing through two engraving marks imprinted in the spectacle lens in FIG. 8, and which passes through a point 3 mm lower in the vertical direction from a mid-point of a line segment connecting the distance power measurement point and the near power measurement point.

FIG. 36 is a graph plotting a surface power in the horizontal direction on a line which is parallel with the horizontal reference line passing through the two engraving marks imprinted on the spectacle lens in FIG. 8 and which passes through a point 3 mm lower in the vertical direction from the mid-point of the line segment connecting the distance power measurement point and the near power measurement point. FIG. 36 relates to Example 6, which corresponds to the above mentioned FIG. 33 (Example 3), where a detailed description on the drawing is omitted.

As will be described later in Example 6, it can be seen from FIG. 36 that a major difference is observed between Comparative example 3 and Example 6 when the surface power at a position that is +5 mm from the point where the main line of sight passes (vertical dotted line), and the surface power at a position that is −5 mm from the point where the main line of sight passes, are compared. In other words, in the case of Comparative example 3, essentially no difference is observed in the powers at the +5 mm position and at the −5 mm position, but in the case of Example 6, the power is higher on the ear side. This is the same when the amount of the base in prism provided to the spectacle lens is 0.25Δ (Example 6-1) or is 0.50Δ (Example 6-2).

In this example, the spectacle lens for the left eye, where the nose side is on the left in the case of FIG. 8, is described as an example, but in the case of the spectacle lens for the right eye, the side on which power is higher is the opposite. Therefore this example can be defined as follows, based on the clear difference between Comparative example 3 and Example 6 (i.e., this embodiment).

The absolute value of the difference between the surface power values in the horizontal direction in the positions ±5 mm from the point through which the main line of sight passes is 0.12 D or more (preferably 0.20 D or more, ideally 0.40 D or more) on the line which is parallel with the horizontal reference line passing through the two engraving marks and which passes through a point that is 3 mm lower in the vertical direction from the mid-point of the line segment connecting the distance power measurement point and the near power measurement point.

The absolute value in Example 6-1 is 0.22 D, and the absolute value in Example 6-2 is 0.50 D.

Examples 7 and 8 corresponding to this example as well may be defined as above, with changing the position of the horizontal line to determine this absolute value. For example, the following definition may be provided.

The absolute value of the difference between the surface power values in the horizontal direction in the positions ±15 mm from the point through which the main line of sight passes is 0.12 D or more (preferably 0.20 D or more, ideally 0.40 D or more) on a line which is parallel with the horizontal reference line passing through the two engraving marks and which passes through a mid-point of the line segment connecting the distance power measurement point F and the near power measurement point N.

The absolute value of the difference between the surface power values in the horizontal direction in the positions ±15 mm from the point through which the main line of sight passes is 0.12 D or more (preferably 0.20 D or more, ideally 0.40 D or more) on a line which is parallel with the horizontal reference line passing through the two engraving marks and which passes through a point that is 3 mm higher in the vertical direction from the mid-point of the line segment connecting the distance power measurement point F and the near power measurement point N.

Each of the above definitions may be used by itself, but it is preferable to appropriately combine these definitions so that the characteristics of this example are enhanced.

The amount of adding the base in prism in this case can be arbitrary, as long as the above mentioned functions are exhibited. At the moment, however, according to the research of the present inventors, the magnified visual effect can be acquired almost with certainty and the influence of aberration and distortion generated by twisting the surface can be minimized if the amount of adding the base in prism is 2Δ or less, in the case of adding the base in prism to the progressive lens from an upper part (e.g. distance portion) to a lower part (near portion) of the lens, even if the individual differences of a user are considered.

The amount of prism which is set in the above mentioned Example 3 or Example 6 is determined considering a plurality of contents, such as implementing the desired β (magnification) and cancelling the unintended base out prism by a predetermined ratio. However the amount of prism determined based on the desired β (magnification) and the amount of prism to cancel the unintended base out prism by a predetermined ratio may be independently estimated. Then the simple sum of amounts of these two prisms may be regarded as the amount of the base in prism, but if this amount of the base in prism is too large, each of the amounts of the two base in prisms may be added after weighing the same. In any case, according to research by the present inventors, the magnified visual effect can be acquired almost with certainty and the influence of aberration and distortion generated by twisting the surface can be minimized, if the amount of the base in prism is 2Δ or less, as mentioned above.

[Embodiment 3]

In this embodiment, the above mentioned technology related to "a pair of spectacle lenses", that is, a design method (manufacturing method) of the spectacle lens, a supply system of the spectacle lens, and a supply program of the spectacle lens is described.

This embodiment is described in the following sequence.
  4. Design method (manufacturing method) of a pair of spectacle lenses for binocular vision
    4-1. Preparation step
    4-2. Design step
    4-3. Manufacturing step
  5. Supply system of a pair of spectacle lenses for binocular vision
    5-1. Receiving unit
    5-2. Designing unit
    5-3. Transmitting unit
  6. Supply program of a pair of spectacle lenses for binocular vision
    <4. Design method (manufacturing method) of a pair of spectacle lenses for binocular vision>

A design method (manufacturing method) of the spectacle lens according to this embodiment is described. In the following description, the content already described in each of the above embodiments is omitted here. For the content not described in the following, a publically known technology may be adopted. For example, the content on the supply system of the spectacle lens disclosed in WO 2007/077848 may be adopted.

(4-1. Preparation Step)

In this step, preparation is performed for the subsequent design step. A first preparation is acquiring information require for designing the spectacle lens. The information related to the spectacle lens is roughly divided into: item-specific information which is data unique to a lens item; and user-specific information which is data unique to a user. The item-specific information includes information on a refractive index n of the lens material, and progressive designing parameters represented by the progressive band length. The user-specific information includes the distance power (e.g. spherical power S, cylinder power C, astigmatic axis AX, prism power P, prism base direction PAX), addition power ADD, layout data (e.g. distance PD, near PD, eye point position), frame shape, and parameters on the positional relationship between the frame and eyes (e.g. forward tilting angle, camber angle, distance between vertexes).

(4-2. Design Step)

In this step, the spectacle lens is designed based on the information of the spectacle lens. During the design, a portion for viewing an object at a finite distance (e.g. near portion) is provided to each of the pair of spectacle lenses for binocular vision, and a shape of a base in prism, which is used to direct the line of sight to a direction different from the object when the users sees the object through the near portion, is provided to this portion.

For the design method, a publically known design method, to provide a prism to a spectacle lens, may be adopted. For example, based on the information on the spectacle lens, prior design information on the optical layout of the original progressive surface, before adding the base in prism of this embodiment to generate parallax, is created in advance. Then the design to add the base in prism is performed using this prior design information.

This prior design information on the optical layout of the original progressive surface may also be acquired in advance in the preparation step.

The above design step can be described for each step as follows, for example.

(4-2-1. Step of Acquiring Prior Design Information)

In this step, prior design information on the optical layout of the original progressive surface is acquired in advance.

(4-2-2. Step of Determining Amount of Base in Prism to be Provided)

In this step, the amount of base in prism is determined. For the determination method, for example, β (magnification) as the target may be determined in (Equation 8), so that P is determined by inverse operation. In this case, the amounts of the base in prism provided to each spectacle lens for binocular vision (e.g. same amounts or different amounts) are also determined in advance.

(4-3. Manufacturing Step)

In this step, the spectacle lens is manufactured based on the result of the design step. For a specific manufacturing method, a publically known method may be adopted. For example, by inputting to a processor the design data acquired in the design step, a lens blank may be processed into a spectacle lens.

Obviously, processing steps other than these steps (e.g. cleaning step, coating) may be added when necessary.

This embodiment is a design method (manufacturing method) of a pair of spectacle lenses for binocular vision, and the above steps concern one of the pair of spectacle lenses. Therefore the above mentioned steps are performed on the other one of the spectacle lenses as well. The amount of base in prism provided to each of the spectacle lenses may be set to the same amount in advance.

Besides the above mentioned content, the content described in [Embodiment 2], for example, may be applied to the design step of this embodiment. This content is described below.

In the design step, a shape of the base in prism is provided to the portion α (i.e., a portion of the spectacle lens in which power changes continuously, and the main line of sight, for which convergence of the user has been considered passes through), so that at least a part of the unintended base out prism that may be generated in the portion is cancelled.

For the design method, for example, prior design information on the optical layout of the original progressive surface, before considering the unintended base out prism, is created in advance based on the information on the spectacle lens (Comparative example 3, which will be described later). Then the above mentioned method corresponding to Examples 3 to 5 which will be described later (twisting the surface shape), or the method corresponding to Examples 6 to 8 which will be described later (twisting the surface shape first, then untwisting the sides back to the original state), may be applied to the prior design information so as to design the portion α, the side portions, and the other portions.

The prior design information on the optical layout of the original progressive surface may be acquired in advance in the preparation step.

Figure 11:
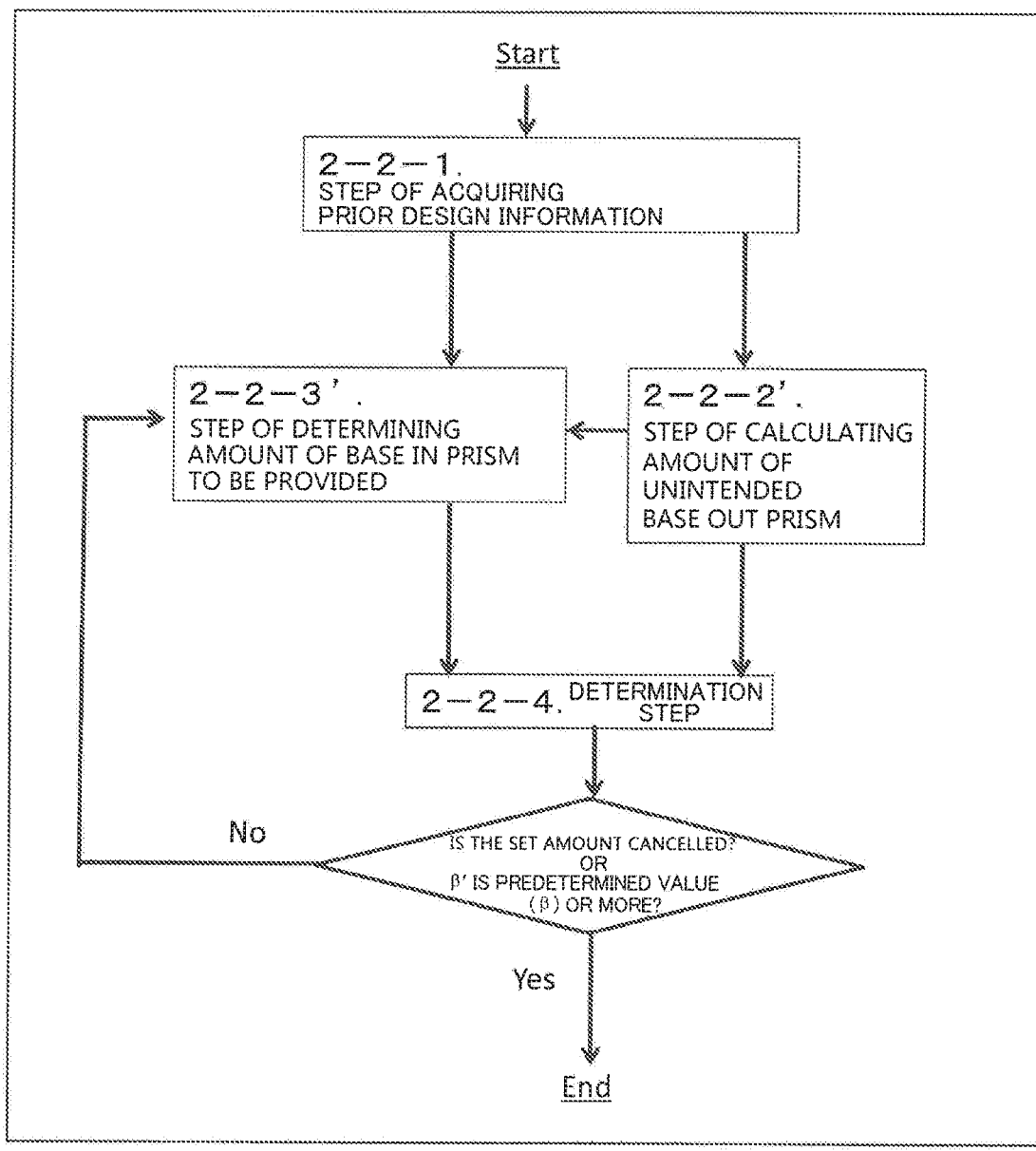
FIG. 11 is a flow chart schematically depicting a design step of a method for manufacturing the spectacle lens according to this embodiment.

The above mentioned design step is described below for each step. FIG. 11 is a flow chart schematically depicting the design step of this embodiment.

(4-2-1. Step of Acquiring Prior Design Information)

In this step, the above mentioned prior design information on the optical layout of the original progressive surface is acquired in advance.

(4-2-2'. Step of Calculating Amount of Unintended Base Out Prism)

This is a step that is preferable to perform, in which the amount of the unintended base out prism, to be generated at each point on the inner surface of the spectral lens, can be estimated based on the prior design information using the above mentioned Prentice's formula (Equation 10). In this step, the amount of the unintended base out prism can be calculated by the computing means in the designing unit, or may be computed by an external server or cloud, for example.

(4-2-3'. Step of Determining Amount of Base in Prism to be Provided)

This is a step that is preferable to be performed for calculating the amount of the base in prism, to be provided corresponding to the amount of the unintended base out prism, which was estimated in the previous step. A percentage of the unintended base out prism to be cancelled may be set in advance, and the amount of the increase of the base in prism in the lower direction may be determined based on this setting.

If the (4-2-2'. Step of calculating amount of unintended base out prism) has not been performed, a design to provide a predetermined amount of base in prism to the spectacle lens is performed. In this case, the (4-2-2'. Step of calculating amount of unintended base out prism) is performed here. Then the predetermined amount of the base in prism and the calculated amount of the unintended base out prism are compared to determine whether the unintended base out prism can be sufficiently cancelled at least in the portion α (4-2-4'. Determination step).

If the resulting degree of cancellation is sufficient, the design step ends, and the manufacturing step is performed. If the degree of cancellation is insufficient, on the other hand, a predetermined amount of base in prism is added, then the amount of base in prism after this addition and the amount of unintended base out prism are compared, and the above determination is performed again. This determination step is repeated until the degree of cancellation becomes sufficient.

As mentioned above, the amount of prism may be determined considering a plurality of contents of: implementing a desired β (magnification); and cancelling the unintended base out prism by a predetermined ratio, or the amount of prism determined based on the desired β (magnification) and the amount of prism to cancel the unintended base out prism by a predetermined ratio may be independently estimated.

In this case, in the above mentioned (4-2-4'. Determination step), only the desired β (magnification) is set in advance, and the amount of base in prism to cancel the amount of unintended base out prism by a desired degree is calculated, and β' is calculated from this amount of base in prism using (Equation 8), then it is determined whether β' is a desired β or more (or in a predetermined range, such as $0.8*β≤β'≤1.2*β$).

By the above configuration, a spectacle lens, which can magnify an object and allow the user to visually perceive the magnified object, and which can cancel at least a part of the unintended base out prism, can be manufactured.

<5. Supply System of a Pair of Spectacle Lenses for Binocular Vision>

Figure 12:
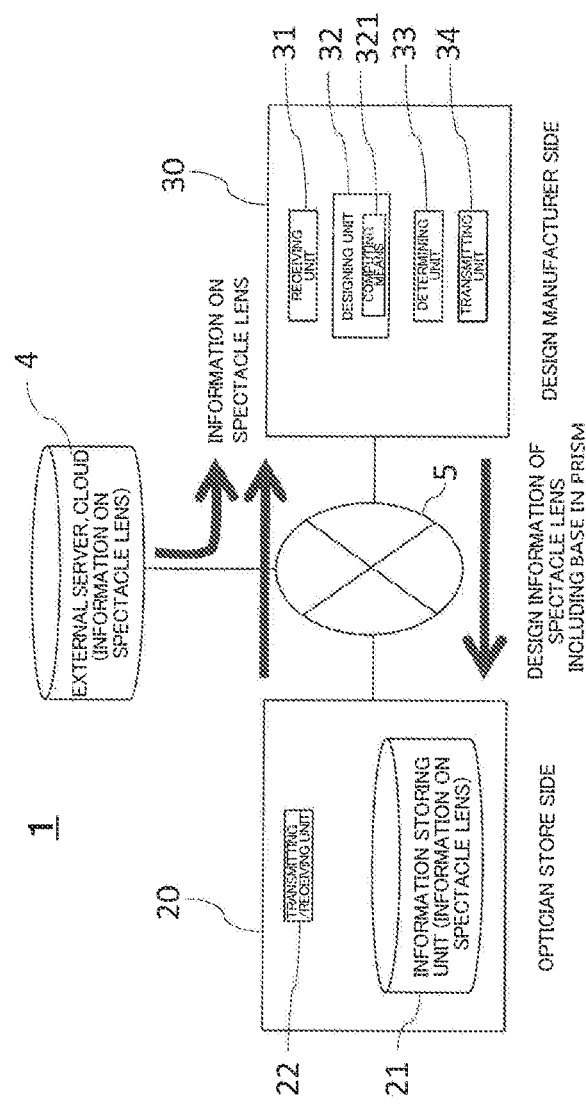
FIG. 12 is a block diagram schematically depicting a spectacle lens supply system according to this embodiment.

The spectacle lens supply system according to this embodiment is now described. The spectacle lens supply system of this embodiment has a control unit for controlling each component, which is described below. In this embodiment, a case where each component, including the control unit, is disposed in a computer installed at a spectacle lens design manufacturer side (design manufacturer side terminal 30), is described. FIG. 12 is a schematic block diagram schematically depicting a spectacle lens supply system 1 according to this embodiment.

(5-1. Receiving Unit 31)

A receiving unit 31 receives information on the spectacle lens from an information storing unit 21 housed in an optical store side terminal 20 via a transmitting/receiving unit 22 using a public line 5. This information is as described above. This information may include the prior design information on the optical layout of the original progressive surface described above as well. This information is normally inputted by an inputting means of a computer installed in an optical store side (optical store side terminal 20). This information may be acquired from a source other than the optical store side terminal 20 (e.g. external server, cloud 4).

(5-2. Designing Unit 32)

A designing unit 32 provides a shape of the base in prism to the near portion, so that the light of sight of the user, when viewing an object through the portion, is directed to a direction that is different from the object, based on the information on the spectacle lens. In order to design the optical layout of the spectacle lens, it is preferable that the designing unit 32 includes a computing means 321 to calculate optical parameters. However, if the optical layout before adding the base in prism is included in the information acquired from a source other than the optical store side terminal 20, the designing unit 32 may, if emphatically expressed, simply add the base in prism to this optical layout. The above mentioned content of the design step, which is a preferred example described in [Embodiment 2], may be performed using this configuration.

A concrete design method is as described in <4. Design method (manufacturing method) of a pair of spectacle lenses for binocular vision>.

(5-3. Transmitting Unit 34)

A transmitting unit 34 transmits the design information acquired from the designing unit 32. The transmission destination is the optical store side terminal 20, for example. The design information (to be more specific, the design information visualized according to the surface astigmatism distribution map or the mean power distribution map) is transmitted to the optical store side, and the optical store side confirms this design information, transmits this design information, if there is no problem, to a manufacturer who manufactures the spectacle lens, and requests the manufacturing of this spectacle lens. If the design manufacturer can also manufacture the spectacle lens, the optical store side terminal 20 transmits information to request the manufacturing of the spectacle lens to the design manufacturer side terminal 30.

If the transmitting unit 34 and a processor of the spectacle lens (not illustrated) exist in a same apparatus, the spectacle lens supply system 1 may be called a "spectacle lens manufacturing apparatus".

A configuration other than the above mentioned components may be added if necessary. For example, as described in <4. Design method (manufacturing method) of a pair of spectacle lenses for binocular vision>, a computing unit (not illustrated) to inversely calculate P from the target β (magnification) or a computing unit (not illustrated) to estimate an amount of unintended prism may be independently disposed, or the computing means 321 of the designing unit 32 may perform these calculations. The amount of base in prism acquired as the result (in some cases, an amount of base in prism corresponding to the β magnification is added) may be transmitted to the designing unit 32, and the design information reflecting the amount of this base in prism may be acquired from the designing unit 32. A determining unit 33, to perform the above determination step, may be disposed. This determining unit 33 may be configured as a part of the designing unit 32.

<6. Supply Program of a Pair of Spectacle Lenses for Binocular Vision>

The technical idea of this embodiment is also reflected in a program to operate the above mentioned spectacle lens supply system 1, and a storage medium thereof. In other words, by using a program which causes a computer (terminal) to function at least as the receiving unit 31, the designing unit 32 and the transmitting unit 34, a spectacle lens which magnifies an object and allows the user wearing the spectacle lens to visually perceive a magnified object can be supplied, and the spectacle lens which can also suppress unnecessary convergence can be preferably supplied.

[Summary]

According to this embodiment, a base in prism is disposed in each of the pair of spectacle lenses for binocular vision independent from the prescription prism. Thereby parallax is intentionally generated between the eyes when the lines of sight pass through each spectacle lens. Then by fusing each object image which entered through each eye (i.e., "fusion"), which is a process performed by the brain of the user in the case of binocular vision, an image of the object is magnified, and the magnified image is perceived by the user.

As a result, the needs to see an object in a magnified state when wearing the spectacle lenses, which increase as a user ages, particularly when an object at a finite distance is viewed, can be satisfied.

Further, to meet the needs, a separate magnifier (loupe) is not required. Therefore the choices of spectacle frames for the user increase, and the above needs can be met by fabricating a pair of spectacle lenses for binocular vision. As a result, an increase in cost can be reduced, and a pair of spectacle lenses can be provided to a user at a reasonable price.

Further, according to the preferred example, the base in prism is provided in an area lower than the distance power measurement point, the prism power measurement point or the fitting point, therefore parallax is not generated in the binocular vision in the distance portion where the lines of sign are parallel. As a result, when the user sees from a distance, the lines of sight become parallel and natural. On the other hand, when the user sees an object at a finite distance, the user can visually perceive a virtual image of the object in the magnified state.

Further, according to the preferred example, even if an unintended base out prism is generated by deflection of the main line of sight toward the nose, the negative influence of the base out prism can be reduced because the original spectacle lens is designed to have a shape to generate a base in prism. In other words, by designing the spectacle lens to have a shape to generate a base in prism in advance, an unintended base out prism that may be generated by convergence can be cancelled. As a result, unnecessary convergence can be suppressed.

By suppressing unnecessary convergence, a user who has worn a simple single vision lens, which has no progressive portion, feels no discomfort even if they change their spectacle lens to a progressive power lens, for example.

[Modification]

The technical scope of the present invention is not limited to the above mentioned embodiments, but includes various changes and modifications within the scope of achieving specific effects acquired by the constituent elements of the invention and combinations thereof.

(Spectacle Lens)

In the case of an occupational lens or a near vision lens, the user is assumed to be performing work that is close at hand, such as reading fine print, handling small objects, or being constantly in a convergence state, therefore the effect of the present invention is especially noteworthy.

In the case of an occupational lens or a near vision lens, the distance portion in (Equation 14) and (Equation 15) is regarded as a portion for viewing a specific distance (e.g. distance power measurement point F→specific distance power measurement point), and the near portion is regarded as a portion for viewing a distance closer than the specific distance.

In [Embodiment 2], even in the case of a single vision lens having plus power, where power changes while moving away from a region to see an object at a predetermined distance, a progressive portion where plus power is added in the lower direction of the spectacle lens still exists, since only in this case the above mentioned distance portion (region which is for seeing from a distance and in which power is approximately constant) does not exist. Even in the case where the distance power measurement point does not exist, a power measurement point, to check whether a predetermined power is acquired, which exists in a predetermined position on the spectacle lens, may be regarded as the above mentioned "power measurement point in the portion for viewing a specific distance".

Further, in the case of the above mentioned single vision lens, the distance portion does not exist, hence the distance power measurement point does not exist, and the "main line of sigh", defined above in the inner surface progressive lens, does not exist either. However, convergence is still generated even if the single vision lens is used, and therefore the problem of the unintended base out prism still occurs. As a consequence, the base in prism can be provided to such a single vision lens via a method similar to the method described above. Practically speaking, the method for specifying the main line of sight is setting "the power measurement point in a portion for viewing a specific distance" as an assumed distance power measurement point, and specifying the line segment connecting this point and the near power measurement point N as the main line of sight.

(Twisting Shape)

In [Embodiment 2], which described a case of the inner surface progressive lens, twisting the shape of the inner surface was described as an example. On the other hand, the prismatic effect can be exhibited only if there is a difference between the gradient of the tangential line on the outer surface and the gradient of the tangential line on the inner surface at a portion where the main line of sight passes through in the cross-sectional view of the spectacle lens in the horizontal direction. Therefore the shape of the outer surface may be continuously twisted in the lower direction of the spectacle lens, or both the inner and outer surfaces may be continuously twisted.

Further, [Embodiment 2] described a case where the surface shape is continuously twisted in the lower direction from the distance power measurement point F or the prism power measurement point P, so as to continuously increase the base in prism, but the base in prism may be generated not by continuously twisting the surface shape but by evenly inclining the entire shape of the inner surface. However, the above mentioned twisting method is preferable since the line of sight is gradually deflecting toward the nose in the convergence, and the prism on the side of the lens surface in the horizontal direction tends to distort.

The above mentioned twisting may be applied to a part of the portion $\alpha$. Critical here is to cancel at least a part of the unintended base out prism. However, applying the above mentioned twisting to all of the portion $\alpha$ is preferable to balance the shape of the spectacle lens.

If the portion where the power changes is only a part of the spectacle lens, and power continuously changes only in this part, then the above mentioned shape can be used only to this part. The unintended base out prism exerts a major influence on the vision of the user only in a portion where plus power is generated in the spectacle lens. Therefore it is sufficient if at least a part of the base out prism can be cancelled in this portion $\alpha$.

EXAMPLES

The present invention is described concretely using the following examples. Needless to say, the present invention is not limited to these examples.

As described above in brief, comparative examples are described first in this section as reference examples. Each comparative example described below is an example of a spectacle lens before the base in prism is provided.

Each example described below, on the other hand, is an example of the spectacle lens having a shape, in which a base in prism, to direct the line of sight of the user viewing an object via the near portion to a direction different from the object, is added.

Each example is now described.

Comparative Example 1 (Reference Example)

In this example, a pair of single vision lenses for presbyopia are fabricated. The parameters of each lens are as follows: the spherical power (S) is +1.50 D, and the cylinder power (C) is 0.00 D. The other parameters are as follows: the base curve is 4.00 D, the refractive index is 1.60, the prism prescription is 0, and the center thickness is 2.00 mm.

Then under the same conditions of H and W and the like described in [Embodiment 1] with reference to FIG. 3 and FIG. 4 (H=32 mm, W=400 mm), β (magnification) is calculated based on the assumption that (Equation 8) is established. In this example, the amount of prism in the horizontal direction (inner direction or outer direction) is 0, then naturally β=1.00 is worked out.

Example 1

A pair of single vision lenses for presbyopia are fabricated using the same parameters as Comparative example 1 (reference example). In Example 1, however, a base in prism is added to each of the spectacle lenses respectively. The amount of prism is 1Δ.

Then β(magnification) is calculated using (Equation 8). As a result, β=1.14, and the size of the virtual image is 1.14 times the actual image of the object (14% increase), which allows the user to perceive the object in the magnified state.

Comparative Example 2 (Reference Example)

In this example, an inner surface progressive lens which has a distance portion, a near portion, and a progressive portion existing therebetween on the inner surface (the outer surface is a spherical surface), is used for each of the spectacle lenses. Therefore the following results are results on the inner surface. The spherical power (S) is 0.00 D, the cylinder power (C) is 0.00 D, and the addition power (ADD) is 1.50 D. The other parameters are as follows: the base curve is 4.00 D, the refractive index is 1.60, the prism prescription is 0, and the center thickness is 2.00 mm.

In this example, the amount of prism in the horizontal direction (inner direction or outer direction) is 0, then naturally β=1.00 is worked out.

Example 2

A pair of inner surface progressive lenses are fabricated using the same parameters as Comparative example 2 (reference example). In Example 2, however, a base in prism is added to each of the spectacle lenses respectively. The amount of prism is 1Δ.

Then β (magnification) is calculated using (Equation 8). As a result, β=1.14, and the size of the virtual image is 1.14 times the actual image of the object (14% increase), which allows the user to perceive the object in the magnified state.

In the following examples, (3-1. Handling of divergence in front view) and (3-2. Handling of unintended base out prism) of [Embodiment 2] are applied.

As briefly described above, Comparative example 3 is a reference example. Comparative example 3 is an example of a spectacle lens before handling the "unintended base out prism".

In Example 3, on the other hand, a base in prism is provided in a part lower than the prism power measurement point P of Comparative example 3, so that the "divergence in the front view" is handled. Then in order to handle the "unintended base out prism", the inner surface shape of the spectacle lens in the horizontal sectional view is continuously twisted in the lower direction of the spectacle lens. Example 3 is an example of the spectacle lens after such processing is performed.

Example 6 is an example of the spectacle lens where the shape (shape of the curve in itself) of the spectacle lens of Example 3 is deformed in the horizontal direction on the sides of the portion α.

Each example is described below.

Comparative Example 3 (Reference Example)

In this example, an outer surface of the spectacle lens is a spherical surface, and an inner surface of the spectral lens is a progressive surface, and the spherical power (S) is 0.00 D, the cylinder power (C) is 0.00 D, and the addition power (ADD) is 2.00 D. The other parameters are as follows: the base curve is 4.00 D, the refractive index is 1.60, the prism prescription is 0, and the center thickness is 2.00 mm, and when the mid-point of a line segment connecting the two engraving marks is an origin, the coordinates of the distance power measurement point F are (0.0, 8.0), the coordinates of the near power measurement point N are (−2.5, −14.0), the coordinates of the prism power measurement point are (0.0, 0.0), and the coordinates of the fitting point are (0.0, 4.0). In this example, it is assumed that the line connecting the distance power measurement point F and the near power measurement point N is the part corresponding to the main line of sight.

Figure 13:
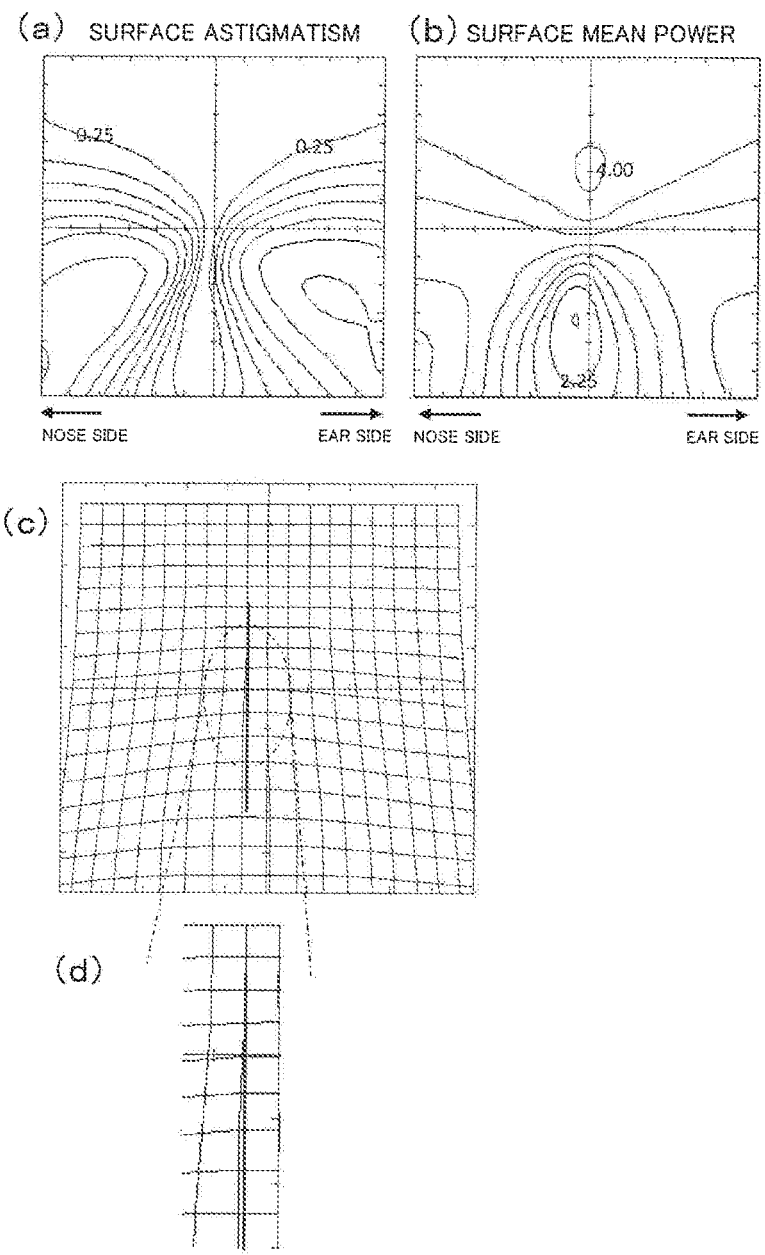
FIG. 13 is a set of diagrams of the spectacle lens according to Comparative example 3 (reference example), where FIG. 13(*a*) is a distribution map of a surface astigmatism, FIG. 13(*b*) is a distribution maps of a surface mean power, FIG. 13(*c*) is a diagram depicting an amount of deflection of a ray along the line of sight when an object is seen through the shape of the inner surface, that is, an amount of the prismatic effect, and FIG. 13(*d*) is an enlarged view of a part of FIG. 13(*c*).

FIG. 13 is a set of diagrams depicting the prior design information on the optical layout of the original progressive surface acquired as the result. FIG. 13(a) is a distribution map of a surface astigmatism, FIG. 13(b) is a distribution map of a surface mean power, FIG. 13(c) is a diagram depicting an amount of deflection of a ray along the line of sight when an object is seen through the shape of the inner surface, that is, an amount of the prismatic effect, and FIG. 13(d) is an enlarged view of a part of FIG. 13(c). Here FIG. 13(c) indicates the correlation between the position of the spectacle lens (inner surface here) in a plan view, and a position where the line of sight actually passes through. In FIG. 13(c), the grid interval is 2.5 mm. (This is the same in the following description as well.)

For example, in FIG. 13(c), the vertical line (bold line), which is shifted from the origin toward the nose by 2.5 mm, is added. In the case of the single vision lens of which power does not change, an unintended base out prism is not generated, therefore the part corresponding to the bold line on the spectacle lens and the grid line corresponding to this bold line match (i.e., the line of sight does not shift in the horizontal direction). Therefore in FIG. 13(c), the grid line and the bold line match, extending in the vertical direction in the upper part of the spectacle lens, even though this is a comparative example.

However, in Comparative example 3, the grid line gradually shifts from the bold line toward the nose in the lower part of the spectacle lens, as illustrated in FIG. 13(d). This means that an unintended base out prism is generated when the user sees the lower part of the spectacle lens, that is, an excessive convergence toward the nose is generated. As illustrated in FIG. 7, if an unintended base out prism is generated, both eyeballs must be excessively turned inward to visually perceive the object. FIG. 13(c) and FIG. 13(d) illustrate this result.

The meaning of the grid lines is the same for the following description as well.

In this and subsequent examples, the astigmatic power is set to 0.00 D. However, it is also possible that the astigmatic power is provided in the spectacle lens because of an astigmatic prescription. Even in this case, the astigmatic power corresponding to the astigmatic prescription can be subtracted, i.e., subjected to vector subtraction, or in the case of the progressive multifocal lens, the surface astigmatism at the distance measurement reference point can be subtracted, i.e., subjected to vector subtraction. Then the distribution map of the surface mean power corresponding to FIG. 13(b) is acquired.

Example 3

Compared to the spectacle lens of Comparative example 3, according to this example, in the inner surface of the spectacle lens, the tangential line on a point of the main line of sight is set to descend toward the nose in the horizontal sectional view, and is set to ascend toward the ear in the horizontal sectional view. Further, the base in prism is continuously provided by continuously twisting the inner surface from the prism power measurement point P to the near power measurement point N. The amount of base in prism at the prism power measurement point P is 0, and the amount of base in prism at the near power measurement point N is 0.25Δ (Example 3-1) and 0.50Δ (Example 3-2). Therefore β (magnification) at the near power measurement point N is 1.03 in Example 3-1 and 1.07 in Example 3-2, that is, the object can be visually perceived in the magnified state, and the effect of the present invention is exhibited.

Figure 14:
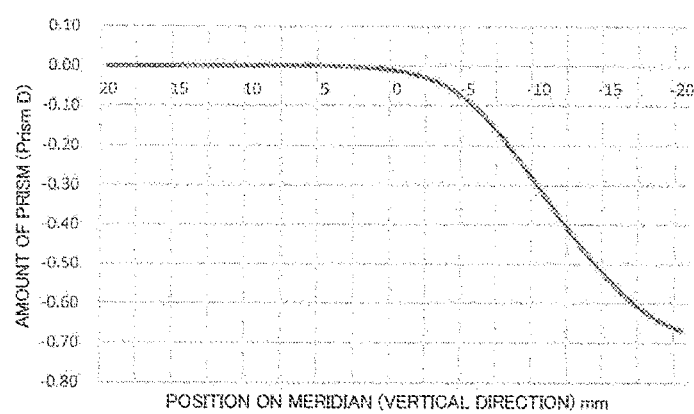
FIG. 14 is a graph depicting an amount of the prism added to the lens as a result of continuously twisting the inner surface of the lens in Example 3, where the abscissa indicates the vertical position of a contact between the main line of sight and the inner surface when the origin is an intersection point of a line segment passing through two engraving marks and the main line of sight (positive direction is the upper direction of the spectacle lens, and negative direction is the lower direction of the spectacle lens), and the ordinate indicates the amount of prism that is added.

FIG. 14 (Example 3-2) depicts the result when the inner surface is continuously twisted like this. The abscissa in FIG. 14 indicates the position of a contact between the main line of sight and the inner surface in the vertical direction when the origin is an intersection point of a line segment passing through two engraving marks and the main line of sight (e.g. center of the two engraving marks), where the positive direction is the upper direction of the spectacle lens, and the negative direction is the lower direction of the spectacle lens, and the ordinate indicates the amount of base in prism (minus sign) that is added as a result of continuously twisting the inner surface.

As depicted in FIG. 14, the spectacle lens is designed such that the absolute value of the base in prism continuously increases by continuously twisting the shape of the inner surface in the lower direction from the point corresponding to the prism power measurement point P (a point where a line, which is parallel with the horizontal reference line passing through the two engraving marks, and which passes through the prism power measurement point P, intersects with the main line of sight).

Figure 20:
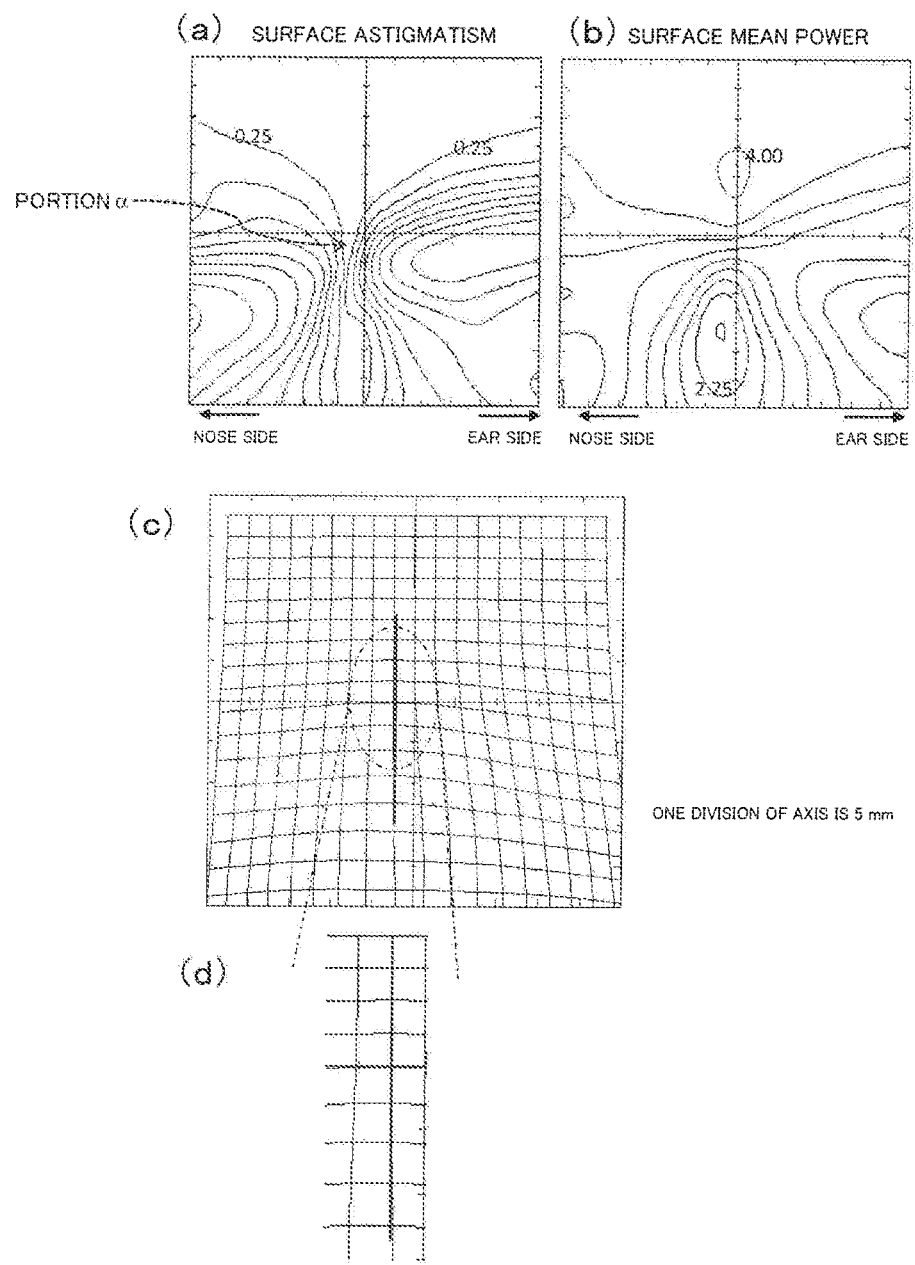
FIG. 20 is a set of diagrams of the spectacle lens according to Example 3, where FIG. 20(*a*) is a distribution map of a surface astigmatism, FIG. 20(*b*) is a distribution map of a surface mean power, FIG. 20(*c*) is a diagram depicting an amount of deflection on a ray along the line of sight when an object is seen through the shape of the inner surface, that is, an amount of prismatic effect, and FIG. 20(*d*) is an enlarged view of a part of FIG. 20(*c*).

FIG. 20 (Example 3-2) depicts the design information acquired in this example. FIG. 20(a) is a distribution map of a surface astigmatism, FIG. 20(b) is a distribution map of a surface mean power, FIG. 20(c) is a diagram depicting an amount of deflection of a ray along the line of sight when an object is seen through the shape of the inner surface, that is, an amount of prismatic effect, and FIG. 20(d) is an enlarged view of a part of FIG. 20(c).

For example, in FIG. 20(c), the vertical line (bold line), which is shifted from the origin toward the nose by 2.5 mm, is added. In this example, even if an unintended base out prism is generated in a lower part of the spectacle lens, the base in prism provided to the inner surface of the spectacle lens makes it possible to match the part corresponding to the bold line on the spectacle lens with the grid line corresponding to this bold line (i.e., the line of sight does not shift in the horizontal direction). Therefore in FIG. 20(c) and FIG. 20(d), the grid line and the bold line match, extending in the vertical direction in the upper part of the spectacle lens. In other words, an unnecessary convergence can be suppressed in this example.

Figure 28:
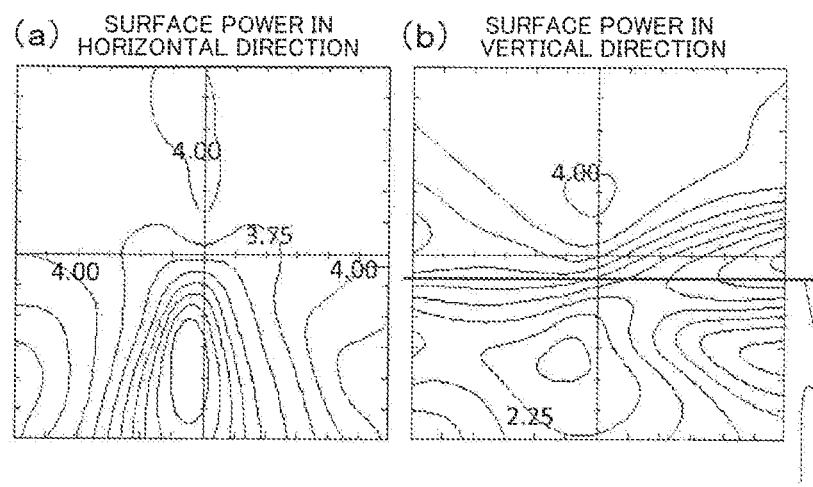
FIG. 28 is a set of diagrams depicting the distribution of a surface power according to Example 4, where

As depicted in FIG. 27(b), which is a distribution map of the surface power in the vertical direction, and FIG. 33, in which the surface power in the vertical direction is plotted, the absolute value of the difference between the surface power values in the positions ±15 mm from the reference position through which the main line of sight passes, on a line which is parallel with the horizontal reference line passing through the two engraving marks and which passes through a point that is 3 mm higher in the vertical direction from the mid-point of the line segment connecting the distance power measurement point F and the near power measurement point N, is 0.38 D in the case of Example 3-1, and 0.76 D in the case of Example 3-2, both exceeding the specified 0.25 D value. In this example, the main line of sight is defined as a line segment connecting the distance power measurement point F and the near power measurement point N, but the position where the main line of sight passes is −0.9 mm in the X coordinate in FIG. 28.

In this and subsequent examples, the value of the "position where the main line of sight passes" corresponds to a horizontal distance (above mentioned so-called amount of inset h) from the vertical line connecting the upper vertex and the lower vertex of the spectacle lens, or from a line which passes through the mid-point of the two engraving marks and is vertical to the line segment connecting the two engraving marks. In the above described example, the case of the horizontal distance from the vertex in the horizontal sectional shape of the spectacle lens was described, but the present invention can be applied to other cases.

Example 4

Figure 15:
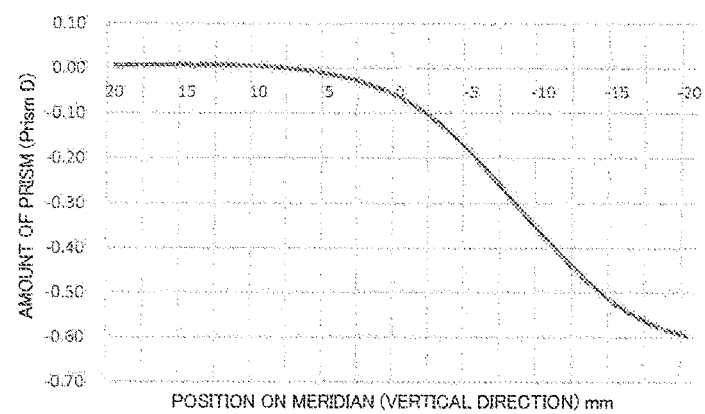
FIG. 15 is a graph depicting an amount of the prism added to the lens as a result of continuously twisting the inner surface of the lens in Example 4, where the abscissa indicates the vertical position of a contact between the main line of sight and the inner surface when the origin is an intersection point of a line segment passing through two engraving marks and the main line of sight (positive direction is the upper direction of the spectacle lens, and negative direction is the lower direction of the spectacle lens), and the ordinate indicates the amount of prism that is added.

In this example, the design conditions are the same as Example 3, but an aspect of continuously adding the base in prism is changed, as depicted in FIG. 15. In concrete terms, the base in prism is continuously added, starting from the mid-position between the distance power measurement point F and the prism power measurement point P. The amount of the base in prism at the near power measurement point N is 0.25Δ (Example 4-1) and 0.50Δ (Example 4-2). β (magnification) in each example is the same as that of Example 3.

Figure 21:
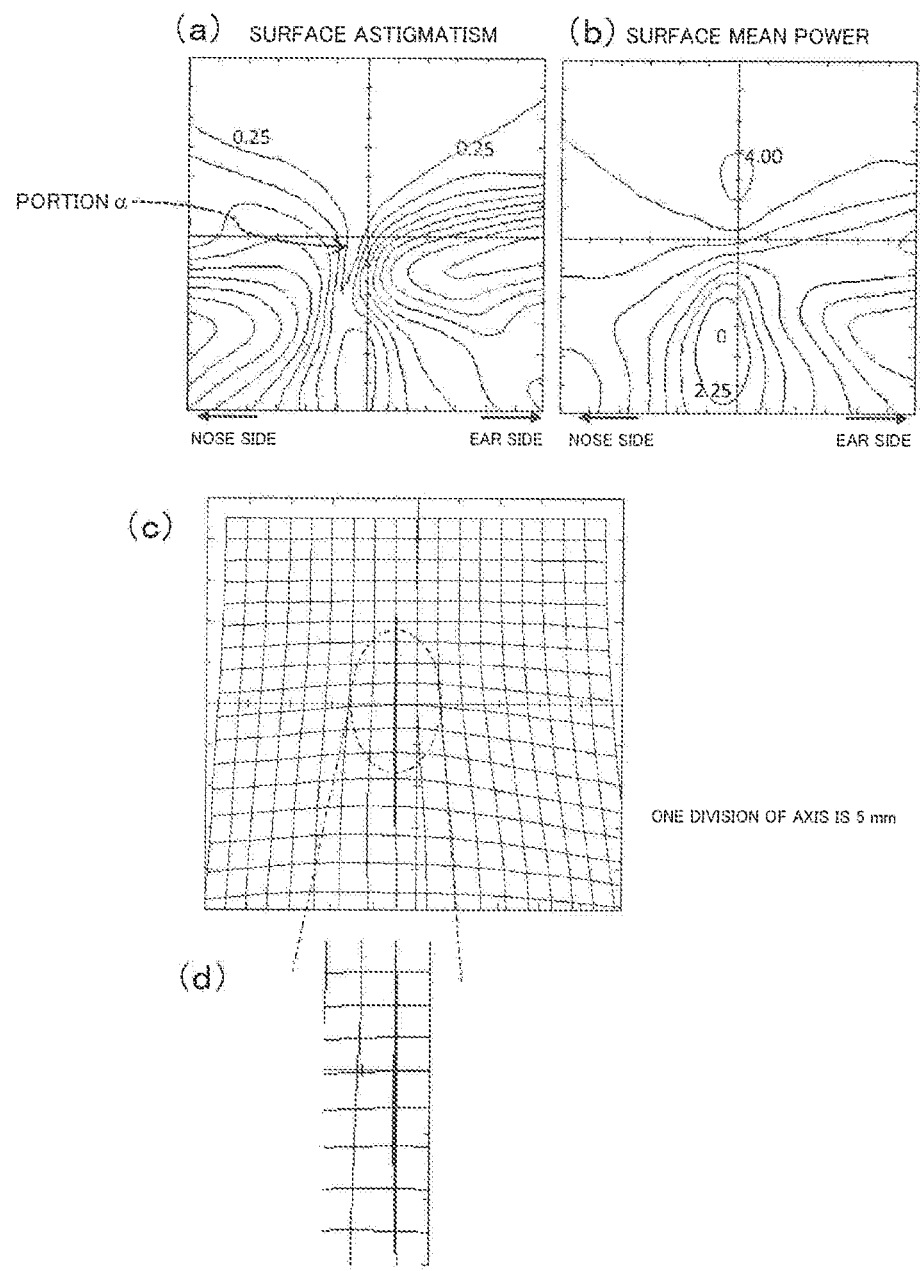
FIG. 21 is a set of diagrams of the spectacle lens according to Example 4, where FIG. 21(*a*) is a distribution map of a surface astigmatism, FIG. 21(*b*) is a distribution map of a surface mean power, FIG. 21(*c*) is a diagram depicting an amount of deflection of a ray along the line of sight when an object is seen through the shape of the inner surface, that is, an amount of prismatic effect, and FIG. 21(*d*) is an enlarged view of a part of FIG. 21(*c*).

FIG. 21 depicts a design information acquired in this example. In FIG. 21(c) and FIG. 21(d), the grid line and the bold line match, extending in the vertical direction in the upper part of the spectacle lens. In other words, an unnecessary convergence can be suppressed in this example as well.

Figure 34:
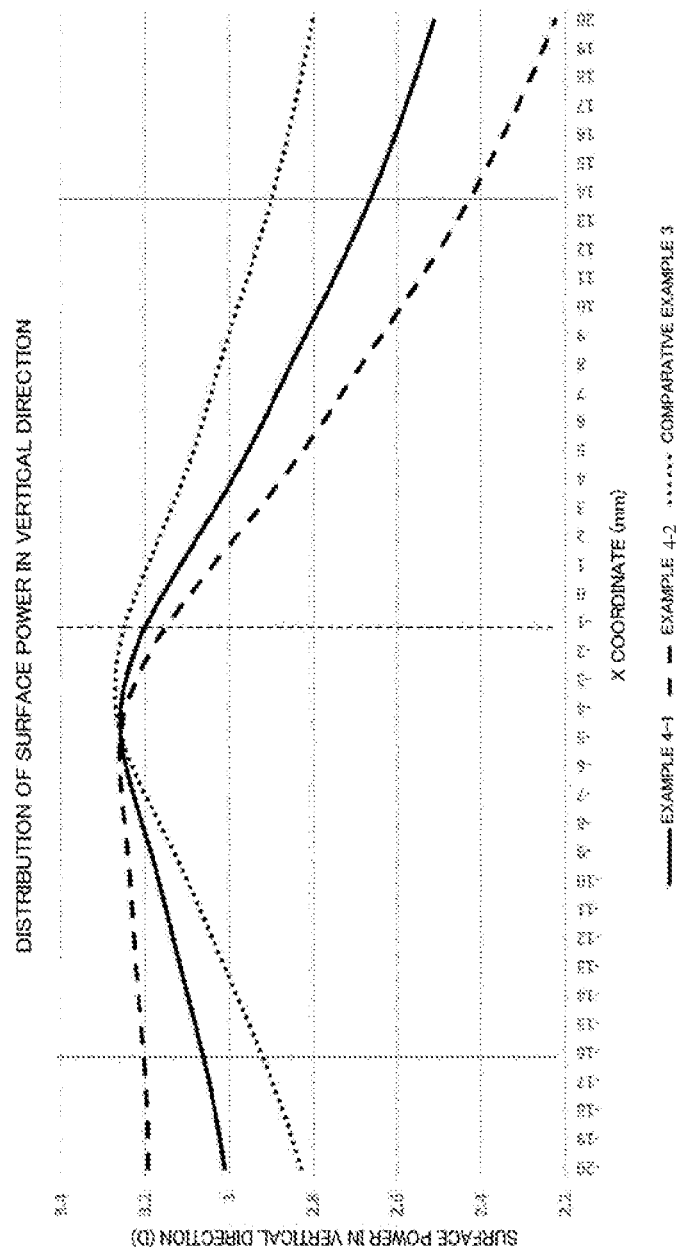
FIG. 34 is a graph, for Example 4 and Comparative example 3, plotting a surface power in the vertical direction on a line which is parallel with a horizontal reference line passing through two engraving marks imprinted in the spectacle lens in FIG. 8, and which passes through a mid-point of a line segment connecting a distance power measurement point and a near power measurement point.

As depicted in FIG. 28(b) which is a distribution map of the surface power in the vertical direction, and FIG. 34 in which the surface power in the vertical direction is plotted, the absolute value of the difference between the surface power values in the positions ±15 mm from the reference position through which the main line of sight passes, on a line which is parallel with the horizontal reference line passing through the two engraving marks and which passes through the mid-point of the line segment connecting the distance power measurement point and the near power measurement point, is 0.41 D in the case of Example 4-1, and 0.78 D in the case of Example 4-2, both exceeding the specified 0.25 D value. In this example, the position where the main line of sight passes is −1.25 mm in the X coordinate in FIG. 34.

Example 5

Figure 16:
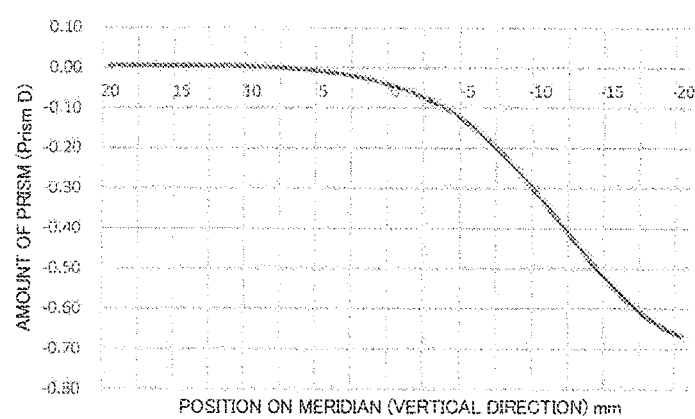
FIG. 16 is a graph depicting an amount of the prism added to the lens as a result of continuously twisting the inner surface of the lens in Example 5, where the abscissa indicates the vertical position of a contact between the main line of sight and the inner surface when the origin is an intersection point of a line segment passing through two engraving marks and the main line of sight (positive direction is the upper direction of the spectacle lens, and negative direction is the lower direction of the spectacle lens), and the ordinate indicates the amount of prism that is added.
Figure 17:
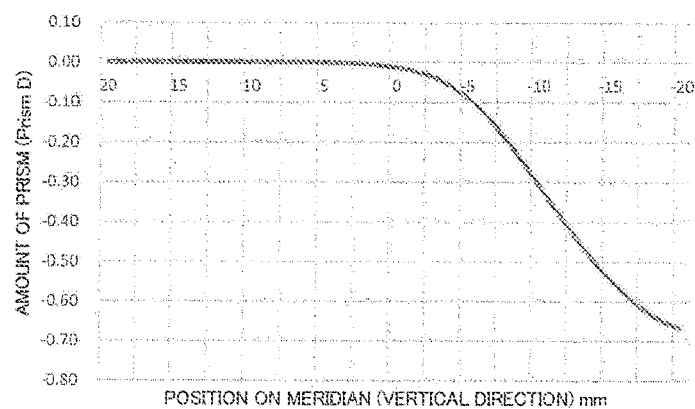
FIG. 17 is a graph depicting an amount of the prism added to the lens as a result of continuously twisting the inner surface of the lens in Example 6, where the abscissa indicates the vertical position of a contact between the main line of sight and the inner surface when the origin is an intersection point of a line segment passing through two engraving marks and the main line of sight (positive direction is the upper direction of the spectacle lens, and negative direction is the lower direction of the spectacle lens), and the ordinate indicates the amount of prism that is added.

In this example, the design conditions are the same as Example 3, but an aspect of continuously adding the base in prism is changed, as depicted in FIG. 16. In concrete terms, the base in prism is continuously added, starting from the fitting point. The amount of the base in prism at the near power measurement point N is 0.25Δ (Example 5-1) and 0.50Δ (Example 5-2). β (magnification) in each example is the same as that of Example 3.

Figure 22:
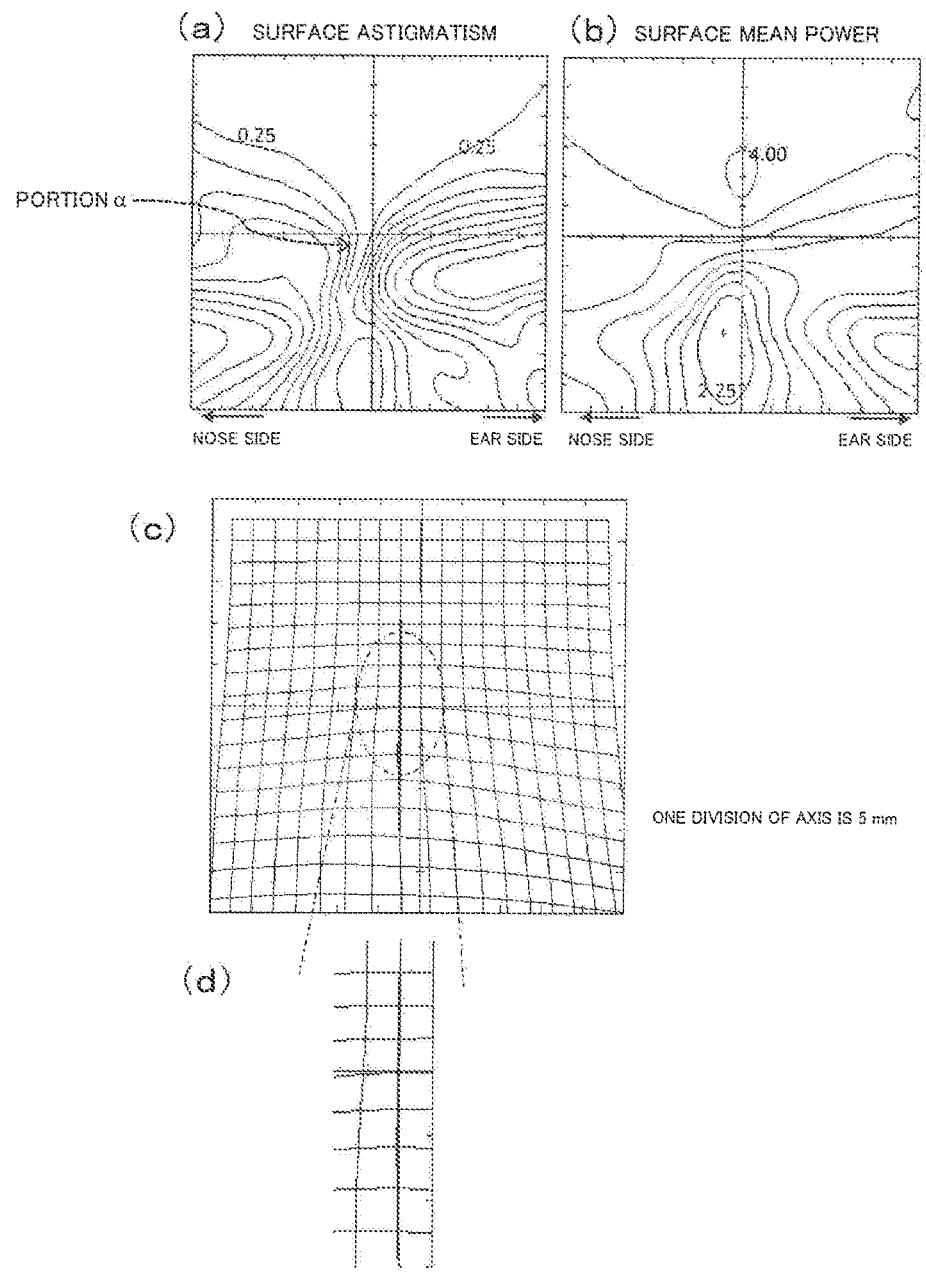
FIG. 22 is a set of diagrams of the spectacle lens according to Example 5, where FIG. 22(*a*) is a distribution map of a surface astigmatism, FIG. 22(*b*) is a distribution map of a surface mean power, FIG. 22(*c*) is a diagram depicting an amount of deflection of a ray along the line of sight when an object is seen through the shape of the inner surface, that is, an amount of prismatic effect, and FIG. 22(*d*) is an enlarged view of a part of FIG. 22(*c*).

FIG. 22 shows design information acquired in this example. In FIG. 22(c) and FIG. 22(d), the grid line and the bold line match, extending in the vertical direction in the upper part of the spectacle lens. In other words, an unnecessary convergence can be suppressed in this example as well.

Figure 29:
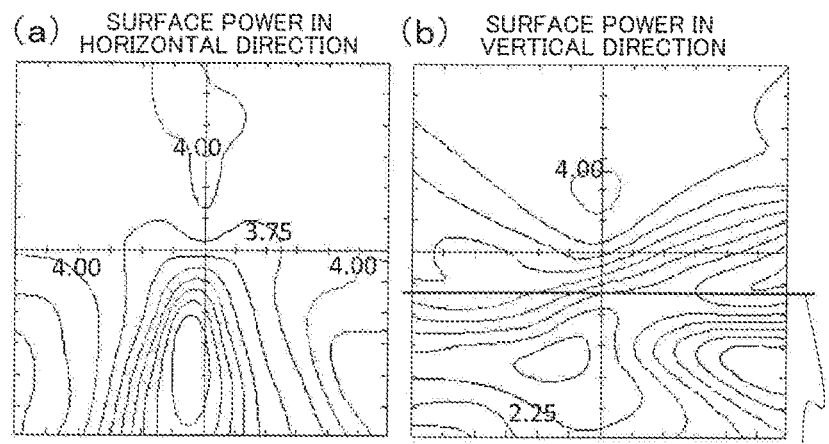
FIG. 29 is a set of diagrams depicting the distribution of a surface power according to Example 5, where
Figure 35:
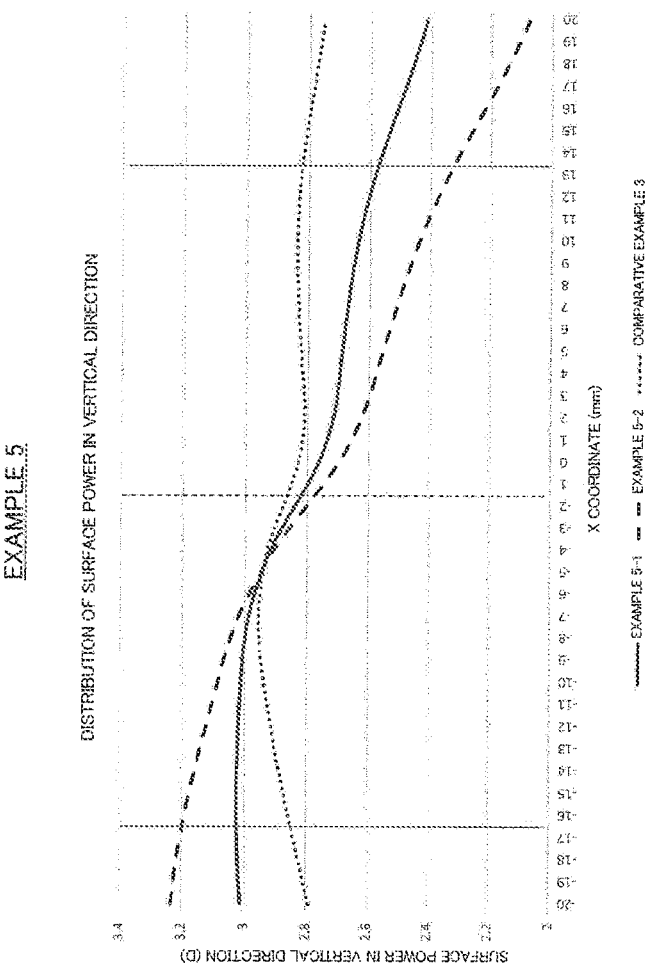
FIG. 35 is a graph, for Example 5 and Comparative example 3, plotting a surface power in the vertical direction on a line which is parallel with a horizontal reference line passing through two engraving marks imprinted in the spectacle lens in FIG. 8, and which passes through a point 3 mm lower in the vertical direction from a mid-point of a line segment connecting a distance power measurement point and a near power measurement point.

As depicted in FIG. 29(b), which is a distribution map of the surface power in the vertical direction, and FIG. 35 in which the surface power in the vertical direction is plotted, the absolute value of the difference between the surface power values in the positions ±15 mm from the reference position through which the main line of sight passes, on a line which is parallel with the horizontal reference line passing through the two engraving marks and which passes through a point that is 3 mm lower in the vertical direction from the mid-point of the line segment connecting the distance power measurement point and the near power measurement point, is 0.45 D in the case of Example 5-1 and 0.88 D in the case of Example 5-2, both exceeding the specified 0.25 D value. In this example, the position where the main line of sight passes is −1.59 mm in the X coordinate in FIG. 35.

Based on the results of Examples 3 to 5, the following can be stipulated.

A shape of continuously (gradually) twisting at least one of the shapes of the object side surface and the eyeball side surface of the spectacle lens in the horizontal sectional view of the portion α, in the lower direction of the spectacle lens, is provided to the portion α.

In this state, the absolute value of the difference between the surface power values in the vertical direction in the positions ±15 mm from the point through which the main line of sight passes is 0.25 D or more, on a line which is parallel with the horizontal reference line passing through the two engraving marks of the spectacle lens and which passes through any point on the line segment between the distance power measurement point F and the near power measurement point N.

In addition to this, any point on the line segment connecting the distance power measurement point F and the near power measurement point N is located in a ±3 mm range in the vertical direction from the mid-point as reference between the distance power measurement point F and the near power measurement point N.

Example 6

In this example, the shape (shape of the curve in itself) of the spectacle lens of Example 3 is deformed on the sides of the portion α. In concrete terms, the base in prism is continuously provided by continuously twisting the inner surface from the prism power measurement point P to the near power measurement point N, just like Example 3. The amount of base in prism at the prism power measurement point P is 0, and the amount of base in prism at the near power measurement point N is 0.25Δ (Example 6-1) and 0.50Δ (Example 6-2). β (magnification) of each example is the same as that of Example 3. Then the shape of the inner surface is gradually deformed on the sides of the portion α so as to be close to the distribution map of the surface astigmatism in FIG. 13(a) according to Comparative example 3 as a reference example.

Figure 23:
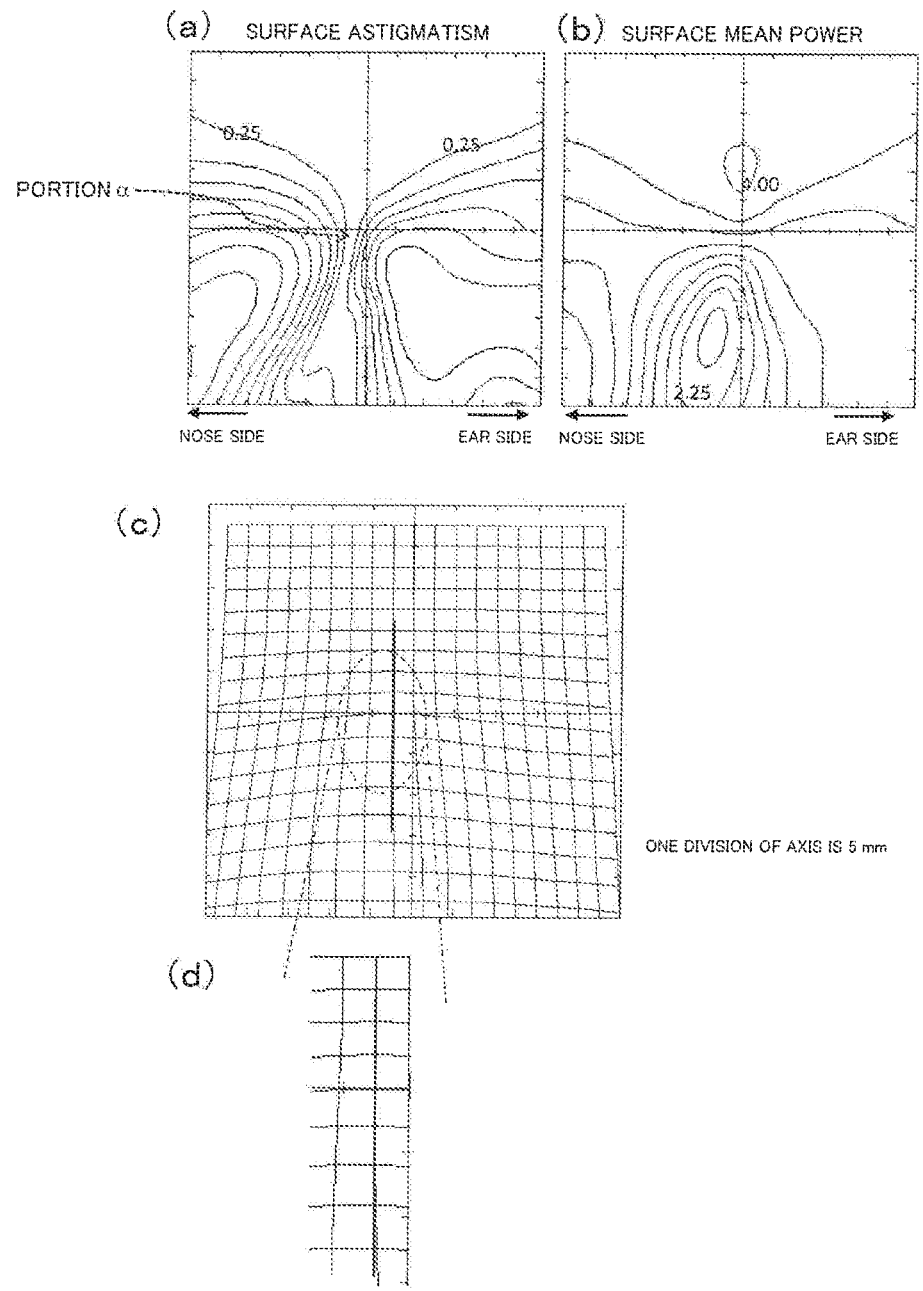
FIG. 23 is a set of diagrams of the spectacle lens according to Example 6, where FIG. 23(*a*) is a distribution map of a surface astigmatism, FIG. 23(*b*) is a distribution map of a surface mean power, FIG. 23(*c*) is a diagram depicting an amount of deflection of a ray along the line of sight when an object is seen through the shape of the inner surface, that is, an amount of prismatic effect, and FIG. 23(*d*) is an enlarged view of a part of FIG. 23(*c*).

In Example 6-2, deformation ends when the state in FIG. 23(a) is generated. FIG. 23(b) is a distribution map of the surface mean power of the spectacle lens acquired as the result, FIG. 23(c) is a diagram depicting a change of the line of sight when an object is seen through the shape of the inner surface, and FIG. 23(d) is an enlarged view of a part of FIG. 23(c).

For example, in FIG. 23(c), the vertical line (bold line), which is shifted from the origin toward the nose by 2.5 mm, is added. In this example, even if an unintended base out prism is generated in a lower part of the spectacle lens, the base in prism provided to the inner surface of the spectacle lens makes it possible to match the part corresponding to the bold line on the spectacle lens with the grid line corresponding to this bold line (i.e., the line of sight does not shift in the horizontal direction). Therefore in FIG. 23(c) and FIG. 23(d), the grid line and the bold line match, extending in the vertical direction in the upper part of the spectacle lens. In other words, an unnecessary convergence can be suppressed in this example.

Further, in the distribution map of the surface astigmatism of this example (FIG. 23(a)), the surface astigmatism similar to the distribution map of the surface astigmatism of the progressive surface, before considering the unintended base out prism (Comparative example 3, FIG. 13(a)), is acquired.

As depicted in FIG. 30(a) which is a distribution map of the surface power in the horizontal direction, and FIG. 36 in which is a surface power in the horizontal direction is plotted, the absolute value of the difference between the surface power values in the positions ±5 mm from the reference position through which the main line of sight passes, on a line which is parallel with the horizontal reference line passing through the two engraving marks and which passes through a point that is 3 mm lower in the vertical direction from the mid-point of the line segment connecting the distance power measurement point and the near power measurement point, is 0.22 D in the case of Example 6-1, and 0.50 D in the case of Example 6-2, both exceeding the specified 0.12 D value. In this example, the main line of sight is defined as a line segment connecting the distance power measurement point and the near power measurement point, but the position where the main line of sight passes is −1.59 mm in the X coordinate in FIG. 36.

Example 7

Figure 18:
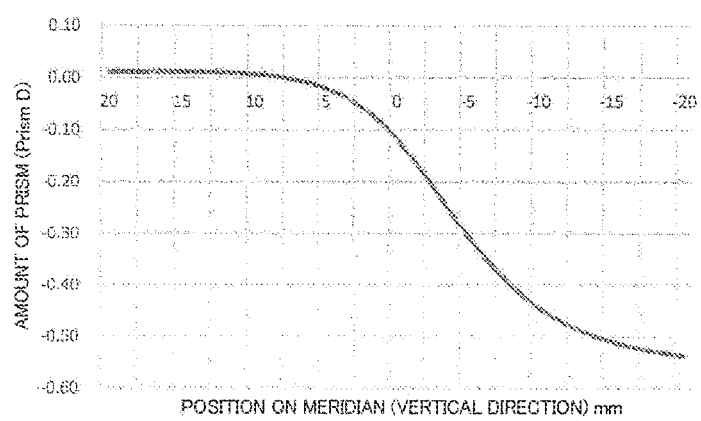
FIG. 18 is a graph depicting an amount of the prism added to the lens as a result of continuously twisting the inner surface of the lens in Example 7, where the abscissa indicates the vertical position of a contact between the main line of sight and the inner surface when the origin is an intersection point of a line segment passing through two engraving marks and the main line of sight (positive direction is the upward direction of the spectacle lens, and negative direction is the downward direction of the spectacle lens), and the ordinate indicates the amount of prism that is added.

In this example, the design conditions are the same as Example 6, but the aspect of continuously adding the base in prism is changed, as depicted in FIG. 18. In concrete terms, the base in prism is continuously added, starting from the mid-position between the distance power measurement point and the prism power measurement point. The amount of the base in prism at the near power measurement point N is 0.25Δ (Example 7-1) and 0.50Δ (Example 7-2). β (magnification) in each example is the same as that of Example 3.

In FIG. 18, the amount of the addition of the prism, in a part higher than the distance power measurement point F (distance portion), has a positive value (i.e., the base out prism is generated), but in a part lower than the distance power measurement point F (progressive portion and near portion), the amount of the addition of the prism has a negative value (i.e., the base in prism is generated). Therefore even in the case of adding the prism as in FIG. 18, the unintended base out prism generated in a portion where the power continuously changes can be cancelled by the base in prism.

Figure 24:
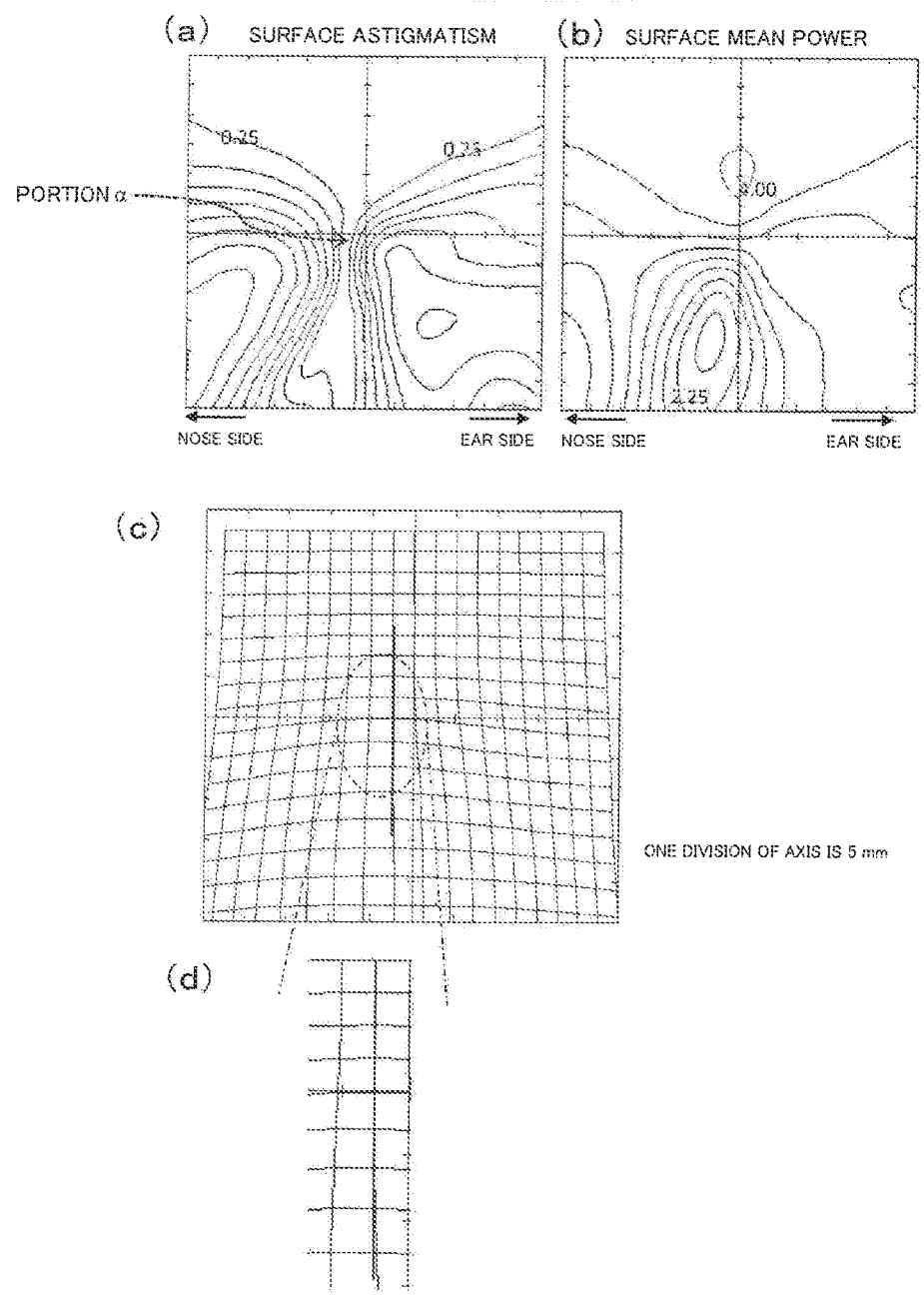
FIG. 24 is a set of diagrams of the spectacle lens according to Example 7, where FIG. 24(*a*) is a distribution map of a surface astigmatism, FIG. 24(*b*) is a distribution map of a surface mean power, FIG. 24(*c*) is a diagram depicting an amount of deflection of a ray along the line of sight when an object is seen through the shape of the inner surface, that is, an amount of prismatic effect, and FIG. 24(*d*) is an enlarged view of a part of FIG. 24(*c*).

FIG. 24 shows design information acquired in this example. In FIG. 24(c) and FIG. 24(d), the grid line and the bold line match, extending in the vertical direction, in the upper part of the spectacle lens. In other words, an unnecessary convergence can be suppressed in this example as well.

Figure 31:
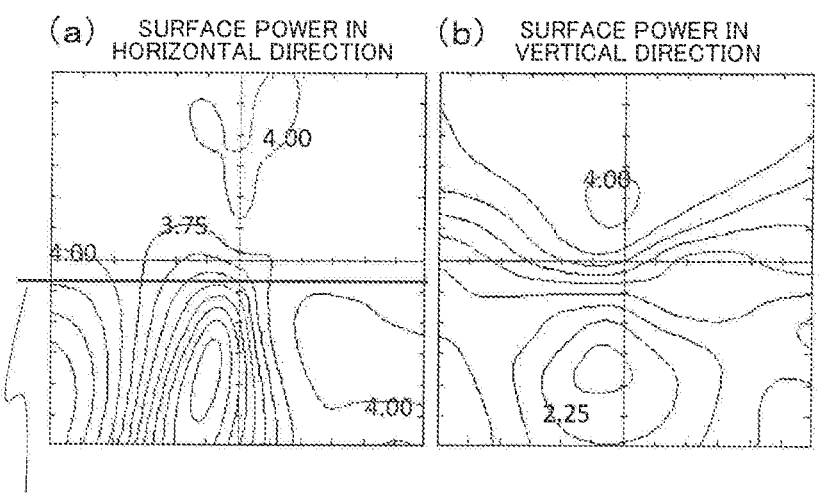
FIG. 31 is a set of diagrams depicting the distribution of a surface power according to Example 7, where
Figure 37:
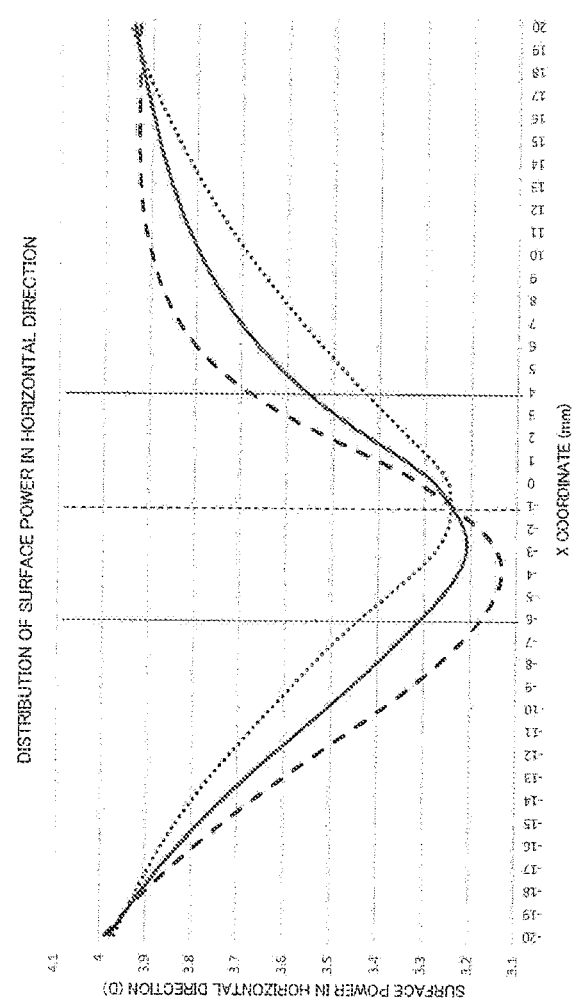
FIG. 37 is a graph, for Example 7 and Comparative example 3, plotting a surface power in the horizontal direction on a line which is parallel with a horizontal reference line passing through two engraving marks imprinted in the spectacle lens in FIG. 8, and which passes through a mid-point of a line segment connecting a distance power measurement point and a near power measurement point.

As depicted in FIG. 31(a), which is a distribution map of the surface power in the horizontal direction, and FIG. 37 in which the surface power in the horizontal direction is plotted, the absolute value of the difference between the surface power values in the positions ±5 mm from the reference position through which the main line of sight passes, on a line which is parallel with the horizontal reference line passing through the two engraving marks and which passes through the mid-point of the line segment connecting the distance power measurement point and the near power measurement point, is 0.20 D in the case of Example 7-1 and 0.46 D in the case of Example 7-2, both exceeding the specified 0.12 D value. In this example, the position where the main line of sight passes is −1.25 mm in the X coordinate in FIG. 37.

Example 8

Figure 19:
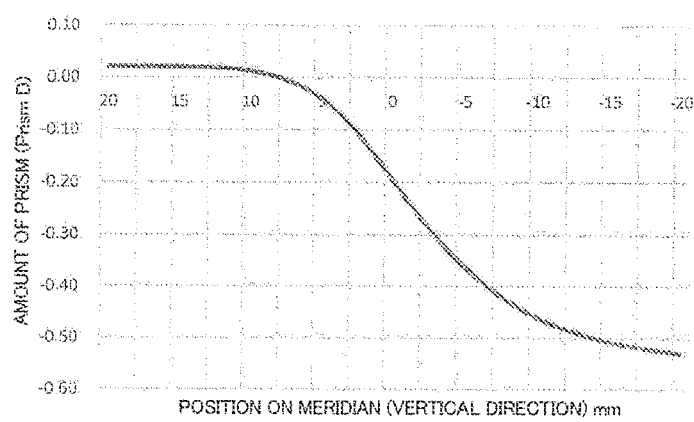
FIG. 19 is a graph depicting an amount of the prism added to the lens as a result of continuously twisting the inner surface of the lens in Example 8, where the abscissa indicates the vertical position of a contact between the main line of sight and the inner surface when the origin is an intersection point of a line segment passing through two engraving marks and the main line of sight (positive direction is the upper direction of the spectacle lens, and negative direction is the lower direction of the spectacle lens), and the ordinate indicates the amount of prism that is added.

In this example, the design conditions are the same as Example 6, but the aspect of continuously adding the base in prism is changed, as depicted in FIG. 19. In concrete terms, the base in prism is continuously added, starting from the distance power measurement point. The amount of the base in prism at the near power measurement point N is 0.25Δ (Example 8-1) and 0.50Δ (Example 8-2). β (magnification) in each example is the same as that of Example 3.

In FIG. 19, the amount of addition of the prism in a part higher than the distance power measurement point F (distance portion) has a positive value, (i.e., the base out prism is generated), but in a part lower than the distance power measurement point F (corridor and near portion), the amount of addition of the prism has a negative value (i.e., the base in prism is generated). Therefore even in the case of the prism that is added as in FIG. 19, the unintended base out prism generated in the portion, where the power continuously changes, can be cancelled by the base in prism.

Figure 25:
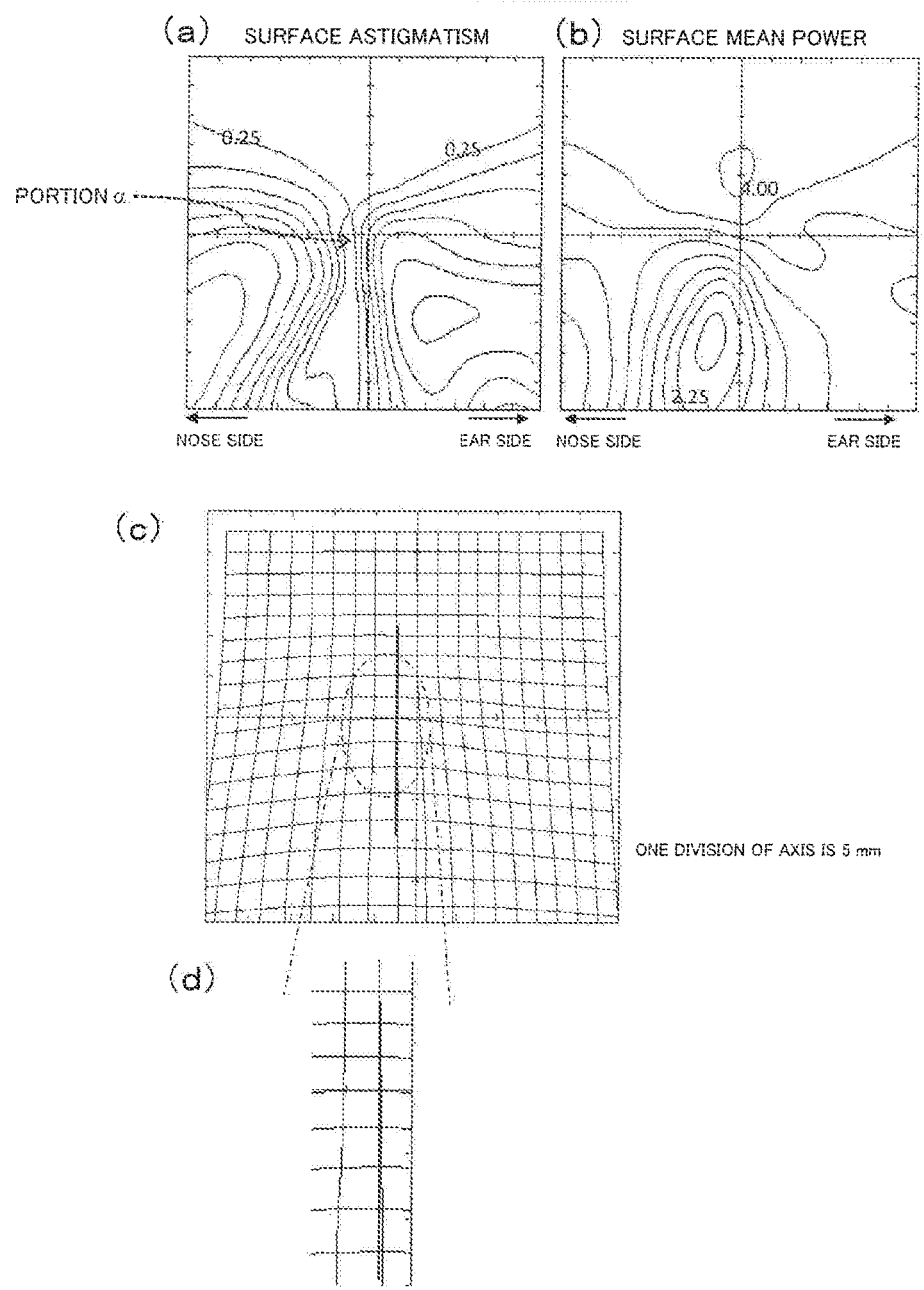
FIG. 25 is a set of diagrams of the spectacle lens according to Example 8, where FIG. 25(*a*) is a distribution map of a surface astigmatism, FIG. 25(*b*) is a distribution map of a surface mean power, FIG. 25(*c*) is a diagram depicting an amount of deflection of a ray along the line of sight when an object is seen through the shape of the inner surface, that is, an amount of prismatic effect.

FIG. 25 shows design information acquired in this example. In FIG. 25(c) and FIG. 25(d), the grid line and the bold line match, extending in the vertical direction, in the upper part of the spectacle lens. In other words, an unnecessary convergence can be suppressed in this example as well.

Figure 32:
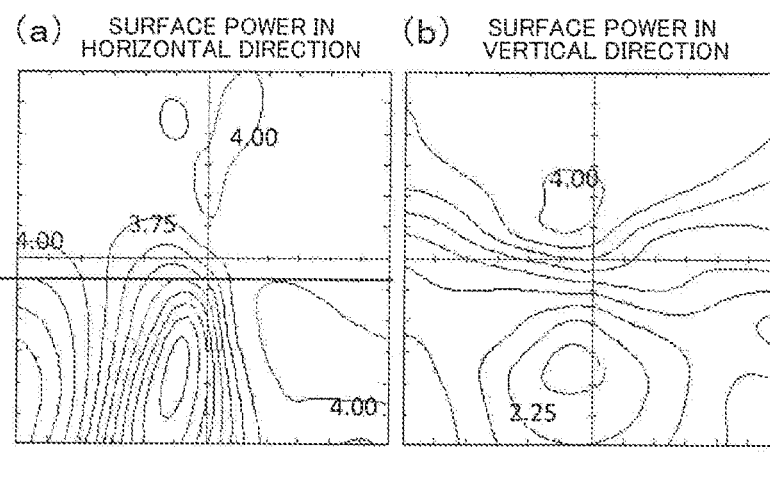
FIG. 32 is a set of diagrams depicting the distribution of a surface power according to Example 8, where
Figure 38:
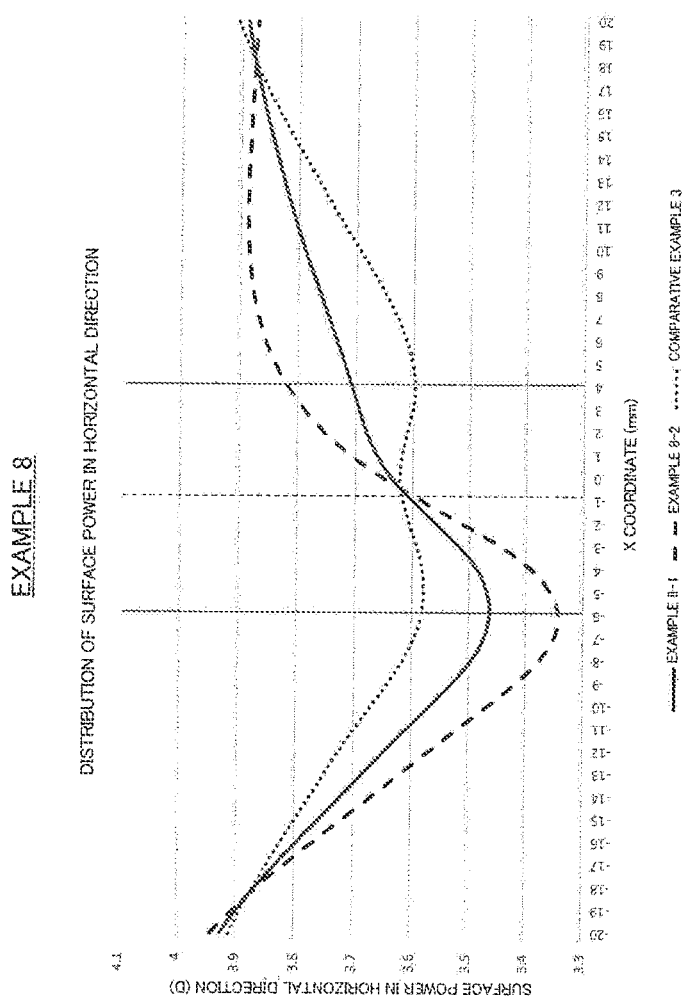
FIG. 38 is a graph, for Example 8 and Comparative example 3, plotting a surface power in the horizontal direction on a line which is parallel with a horizontal reference line passing through two engraving marks imprinted in the spectacle lens in FIG. 8, and which passes through a point 3 mm higher in the vertical direction from a mid-point of a line segment connecting a distance power measurement point and a near power measurement point.

As depicted in FIG. 32(a) which is a distribution map of the surface power in the horizontal direction, and FIG. 38 in which the surface power in the horizontal direction is plotted, the absolute value of the difference between the surface power values in the positions ±5 mm from the reference position through which the main line of sight passes, on a line which is parallel with the horizontal reference line passing through the two engraving marks and which passes through a point that is 3 mm higher in the vertical direction from the mid-point of the line segment connecting the distance power measurement point and the near power measurement point, is 0.24 D in the case of Example 8-1 and 0.47 D in the case of Example 8-2, both exceeding the specified 0.12 D value. In this example, the position where the main line of sight passes is −0.90 mm in the X coordinate in FIG. 38.

Based on the results of Examples 6 to 8, the following can be stipulated.

A shape of continuously (gradually) twisting at least one of the shapes of the object side surface and the eyeball side surface of the spectacle lens in the horizontal sectional view of the portion α in the lower direction of the spectacle lens is provided to the portion α.

In this state, the absolute value of the difference between the surface power values in the horizontal direction in the positions ±15 mm from the point through which the main line of sight passes is 0.12 D or more, on a line which is parallel with the horizontal reference line passing through the two engraving marks of the spectacle lens and which passes through any point on the line segment between the distance power measurement point F and the near power measurement point N.

In addition to this, any point on the line segment connecting the distance power measurement point F and the near power measurement point N is located in a ±3 mm range in the vertical direction from the mid-point between the distance power measurement point and the near power measurement point.

As a result, according to this embodiment, a technology to magnify the object and allow the user to visually perceive a magnified object by wearing the spectacle lens can be provided in addition to the above mentioned various effects, and a preferably technology on the spectacle lens which can suppress an unnecessary convergence can also be provided.

REFERENCE SIGNS LIST

1 Supply system of (a pair of) spectacle lens (for binocular vision)
20 Optical store side terminal
21 Information storing unit
22 Transmitting/receiving unit
30 Design manufacturer side terminal
31 Receiving unit
32 Designing unit
321 Computing means
33 Determining unit
34 Transmitting unit
4 External server, cloud
5 Public line

The invention claimed is:

1. A pair of spectacles lenses for binocular vision, wherein, when (i) an inner horizontal direction of each of the spectacle lenses is a direction toward the nose of a user who wears the spectacle lenses, and an outer horizontal direction of each of the spectacle lenses is a direction toward an ear of the user, and (ii) an upper direction of each of the spectacle lenses is a direction of top of the spectacle lens and a lower direction of each of the spectacle lenses is a direction of bottom of the spectacle lens while the user wears the spectacle lens, each lens of the spectacles lenses for binocular vision comprises:
- a specific distance portion for viewing an object at a specific distance,
- a near portion for viewing an object at a distance nearer than the specific distance,
- a progressive portion where power changes continuously between the distance portion and near portion, and
- a shape of a base in prism added in a part that is lower than (i) a specific distance power measurement point of the specific distance portion, (ii) a prism power measurement point, or (iii) a fitting point in the spectacle lens, such that a line of sight of the user viewing the object through the part is directed to a direction that is different from a direction of a line which connects the part and the object,
- wherein an unintended base out prism of each lens ($P_N-P_F$) satisfies the following equation:

$$P_N-P_F<ADD*h/10$$

where $P_F$ denotes an amount of prism ($\Delta$) measured at the specific distance power measurement point of the specific distance portion, $P_N$ denotes an amount of prism ($\Delta$) measured at a near power measurement point of the near portion, the amount of prism indicates a positive value in a case of a base out prism and a negative value in a case of a base in prism, ADD denotes an addition power (D), and h denotes an amount of inset in the spectacle lens, in which a positive direction is toward the nose and a negative direction is toward the ear when viewed from a vertical line connecting an upper vertex and a lower vertex of the spectacle lens.

2. The pair of spectacle lenses for binocular vision according to claim 1, wherein, for each lens of the pair of spectacle lenses, the shape of the base in prism is provided in at least a portion of the progressive portion.

3. The pair of spectacle lenses for binocular vision according to claim 2, wherein the shape of the base in prism provided in at least the portion of the progressive portion is formed to increase toward the lower direction of the spectacle lenses.

4. The pair of spectacle lenses for binocular vision according to claim 1, wherein, for each lens of the pair of spectacle lenses, each of the spectacle lenses satisfies the following equation:

$$|P_N-P_F-ADD*h/10|\geq 0.25.$$

5. The pair of spectacle lenses for binocular vision according to claim 1, wherein, for each lens of the pair of spectacle lenses, the shape of the base in prism is formed by twisting in the lower direction of the spectacle lens at least one of an object side surface and an eyeball side surface of the spectacle lens as viewed in a horizontal cross-sectional view of the progressive portion, so that the amount of the base in prism increases in the lower direction.

6. The pair of spectacle lenses for binocular vision according to claim 5, wherein an absolute value of a difference between surface power values in the vertical direction in positions ±15 mm from a point, through which a main line of sight passes, is 0.25 D or more, on a line which is parallel with a line passing through two engraving marks of the spectacle lens and which passes through any point on a line segment connecting the specific distance power measurement point and the near power measurement point.

7. The pair of spectacle lenses for binocular vision according to claim 6, wherein any point on the line segment connecting the specific distance power measurement point and the near power measurement point is located in a ±3 mm range in a perpendicular direction from a mid-point as reference between the specific distance power measurement point and the near power measurement point.

8. The pair of spectacle lenses for binocular vision according to claim 5, wherein an absolute value of a difference between surface power values in the horizontal direction in positions ±5 mm from a point, through which a main line of sight passes, is 0.12 D or more, on a line which is parallel with a line passing through two engraving marks of the spectacle lens and which passes through any point on a line segment connecting the specific distance power measurement point and the near power measurement point.

9. The pair of spectacle lenses for binocular vision according to claim 8, wherein any point on the line segment connecting the specific distance power measurement point and the near power measurement point is located in a ±3 mm range in the perpendicular direction from a mid-point as reference between the specific distance power measurement point and the near power measurement point.

10. The pair of spectacle lenses for binocular vision according to claim 1, wherein, for each lens of the pair of spectacle lenses, an absolute value of a difference between surface power values in the vertical direction in positions ±15 mm from a point, through which a main line of sight passes, is 0.25 D or more, on a line which is parallel with a line passing through two engraving marks of the spectacle lens and which passes through a point that is 3 mm higher in the vertical direction from a mid-point of a line segment connecting the specific distance power measurement point and the near power measurement point.

11. The pair of spectacle lenses for binocular vision according to claim 1, wherein, for each lens of the pair of spectacle lenses, an absolute value of a difference between surface power values in the vertical direction in positions ±15 mm from a point, through which a main line of sight passes, is 0.25 D or more, on a line which is parallel with a line passing through two engraving marks of the spectacle lens and which passes through a mid-point of a line segment connecting the specific distance power measurement point and the near power measurement point.

12. The pair of spectacle lenses for binocular vision according to claim 1, wherein, for each lens of the pair of spectacle lenses, an absolute value of a difference between surface power values in the vertical direction in positions ±15 mm from a point, through which a main line of sight passes, is 0.25 D or more, on a line which is parallel with a line passing through two engraving marks of the spectacle lens and which passes through a point that is 3 mm lower in the vertical direction from a mid-point of a line segment connecting the specific distance power measurement point and the near power measurement point.

13. The pair of spectacle lenses for binocular vision according to claim 1, wherein, for each lens of the pair of spectacle lenses, an absolute value of a difference between surface power values in the horizontal direction in positions ±5 mm from a point, through which a main line of sight passes, is 0.12 D or more, on a line which is parallel with a line passing through two engraving marks of the spectacle lens and which passes through a point that is 3 mm lower in the vertical direction from a mid-point of a line segment connecting the specific distance power measurement point and the near power measurement point.

14. The pair of spectacle lenses for binocular vision according to claim 1, wherein, for each lens of the pair of spectacle lenses, an absolute value of a difference between surface power values in the horizontal direction in positions ±5 mm from a point, through which a main line of sight passes, is 0.12 D or more, on a line which is parallel with a line passes through two engraving marks of the spectacle lens and which passes through a mid-point of a line segment connecting the specific distance power measurement point and the near power measurement point.

15. The pair of spectacle lenses for binocular vision according to claim 1, wherein, for each lens of the pair of spectacle lenses, when the upper direction of each of the spectacle lenses is a direction of top of the spectacle lens, and the lower direction of each of the spectacle lenses is a direction of bottom of the spectacle lens while the user wears the spectacle lens, an absolute value of a difference between surface power values in the horizontal direction in positions ±5 mm from a point, through which a main line of sight passes, is 0.12 D or more, on a line which is parallel with a line passing through two engraving marks of the spectacle lens and which passes through a point that is 3 mm higher in the vertical direction from a mid-point of a line segment connecting the specific distance power measurement point and the near power measurement point.

16. The pair of spectacle lenses for binocular vision according to claim 1, wherein, for each lens of the pair of spectacle lenses, an amount of the base in prism is 2Δ or less.

17. A manufacturing method for a pair of spectacle lenses for binocular vision, the method comprising:
 a designing step of designing the spectacles lenses for binocular vision when (i) an inner horizontal direction of each of the spectacle lenses is a direction toward the nose of a user who wears the spectacle lenses, and an outer horizontal direction of each of the spectacle lenses is a direction toward an ear of the user, and (ii) an upper direction of each of the spectacle lenses is a direction of top of the spectacle lens and a lower direction of each of the spectacle lenses is a direction of bottom of the spectacle lens while the user wears the spectacle lens, each lens of the spectacles lenses for binocular vision comprising:
  a specific distance portion for viewing an object at a specific distance,
  a near portion for viewing an object at a distance nearer than the specific distance,
  a progressive portion where power changes continuously between the distance portion and near portion, and
  a shape of a base in prism added in a part that is lower than (i) a specific distance power measurement point of the specific distance portion, (ii) a prism power measurement point, or (iii) a fitting point in the spectacle lens, such that a line of sight of the user viewing the object through the part is directed to a direction that is different from a direction of a line which connects the part and the object,
  wherein an unintended base out prism of each lens satisfies the following equation:

$P_N - P_F < ADD * h/10$ where $P_F$ denotes an amount of prism (Δ) measured at the specific distance power measurement point of the specific distance portion, $P_N$ denotes an amount of prism (Δ) measured at a near power measurement point of the near portion, the amount of prism indicates a positive value in a case of a base out prism and a negative value in a case of a base in prism, ADD denotes an addition power (D), and h denotes an amount of inset in the spectacle lens, in which a positive direction is toward the nose and a negative direction is toward the ear when viewed from a vertical line connecting an upper vertex and a lower vertex of the spectacle lens; and
 a manufacturing step of manufacturing the pair of spectacle lenses for binocular vision based on results of the designing step.

18. A system for supplying a pair of spectacle lenses for binocular vision, the system comprising:
 a designing unit configured to design the spectacles lenses for binocular vision when (i) an inner horizontal direction of each of the spectacle lenses is a direction toward the nose of a user who wears the spectacle lenses, and an outer horizontal direction of each of the spectacle lenses is a direction toward an ear of the user, and (ii) an upper direction of each of the spectacle lenses is a direction of top of the spectacle lens and a lower direction of each of the spectacle lenses is a direction of bottom of the spectacle lens while the user wears the spectacle lens, each lens of the spectacles lenses for binocular vision comprising:
  a specific distance portion for viewing an object at a specific distance,
  a near portion for viewing an object at a distance nearer than the specific distance,
  a progressive portion where power changes continuously between the distance portion and near portion, and
  a shape of a base in prism added in a part that is lower than (i) a specific distance power measurement point of the specific distance portion, (ii) a prism power measurement point, or (iii) a fitting point in the spectacle lens, such that a line of sight of the user viewing the object through the part is directed to a direction that is different from a direction of a line which connects the part and the object,
  wherein an unintended base out prism of each lens satisfies the following equation:

$P_N - P_F < ADD * h/10$ where $P_F$ denotes an amount of prism (Δ) measured at the specific distance power measurement point of the specific distance portion, $P_N$ denotes an amount of prism (Δ) measured at a near power measurement point of the near portion, the amount of prism indicates a positive value in a case of a base out prism and a negative value in a case of a base in prism, ADD denotes an addition power (D), and h denotes an amount of inset in the spectacle lens, in which a positive direction is toward the nose and a negative direction is toward the ear when viewed from a vertical line connecting an upper vertex and a lower vertex of the spectacle lens; and
 a manufacturing unit configured to manufacture the pair of spectacle lenses for binocular vision based on results of the designing unit.

19. A non-transitory computer-readable medium storing a program for supplying a pair of spectacle lenses for binocular vision that causes a computer to function as:
 a designing unit configured to design the spectacles lenses for binocular vision when (i) an inner horizontal direction of each of the spectacle lenses is a direction toward the nose of a user who wears the spectacle lenses, and an outer horizontal direction of each of the spectacle lenses is a direction toward an ear of the user, and (ii) an upper direction of each of the spectacle lenses is a direction of top of the spectacle lens and a lower direction of each of the spectacle lenses is a direction of bottom of the spectacle lens while the user wears the spectacle lens, each lens of the spectacles lenses for binocular vision comprising:
- a specific distance portion for viewing an object at a specific distance,
- a near portion for viewing an object at a distance nearer than the specific distance,
- a progressive portion where power changes continuously between the distance portion and near portion, and
- a shape of a base in prism added in a part that is lower than (i) a specific distance power measurement point of the specific distance portion, (ii) a prism power measurement point, or (iii) a fitting point in the spectacle lens, such that a line of sight of the user viewing the object through the part is directed to a direction that is different from a direction of a line which connects the part and the object,
- wherein an unintended base out prism of each lens satisfies the following equation:

$$P_N-P_F<ADD*h/10,$$

where $P_F$ denotes an amount of prism (Δ) measured at the specific distance power measurement point of the specific distance portion, $P_N$ denotes an amount of prism (Δ) measured at a near power measurement point of the near portion, the amount of prism indicates a positive value in a case of a base out prism and a negative value in a case of a base in prism, ADD denotes an addition power (D), and h denotes an amount of inset in the spectacle lens, in which a positive direction is toward the nose and a negative direction is toward the ear when viewed from a vertical line connecting an upper vertex and a lower vertex of the spectacle lens; and
- a manufacturing unit configured to manufacture the pair of spectacle lenses for binocular vision based on results of the designing unit.

20. The pair of spectacle lenses for binocular vision according to claim 1, wherein, for each lens of the pair of spectacle lenses, the shape of the base in prism is further provided on at least one side adjacent to at least a portion of the progressive portion.

21. The pair of spectacle lenses for binocular vision according to claim 1, wherein, for each lens of the pair of spectacle lenses, the shape of the base in prism is also formed in portions in the outer horizontal direction and in the inner horizontal direction when viewed from the progressive portion of the spectacle lens.

22. The pair of spectacle lenses for binocular vision according to claim 20, wherein an amount of the shape of the base in prism provided on the at least one side adjacent to at least the portion of the progressive portion is smaller than an amount of the shape of the base in prism provided on at least the portion of the progressive portion.

* * * * *